US006946817B2

(12) United States Patent
Fischer et al.

(10) Patent No.: US 6,946,817 B2
(45) Date of Patent: Sep. 20, 2005

(54) SYSTEM AND METHOD FOR POWERING AND CHARGING A MOBILE COMMUNICATION DEVICE

(75) Inventors: Daniel M. Fischer, Waterloo (CA); Dan G. Radut, Waterloo (CA); Michael F. Habicher, Cambridge (CA); Quang A. Luong, Kitchener (CA); Jonathan T. Malton, Kitchener (CA); Charles B. Meyer, Dorney (GB)

(73) Assignee: Research In Motion Limited, Waterloo (CA)

( * ) Notice: Subject to any disclaimer, the term of this patent is extended or adjusted under 35 U.S.C. 154(b) by 109 days.

(21) Appl. No.: 10/087,391

(22) Filed: Mar. 1, 2002

(65) Prior Publication Data

US 2003/0054703 A1 Mar. 20, 2003

(Under 37 CFR 1.47)

Related U.S. Application Data

(60) Provisional application No. 60/273,021, filed on Mar. 1, 2001.

(51) Int. Cl.[7] .................................................. H02J 7/00
(52) U.S. Cl. ........................ 320/132; 320/107; 455/423
(58) Field of Search .............................. 320/105, 114, 320/115, 128, 134, 132, 107; 455/423

(56) References Cited

U.S. PATENT DOCUMENTS

| 3,775,659 | A | | 11/1973 | Carlsen, II |
| 4,433,251 | A | | 2/1984 | Banks et al. |
| 4,510,431 | A | | 4/1985 | Winkler |
| 5,173,855 | A | | 12/1992 | Nielsen et al. |
| 5,229,649 | A | | 7/1993 | Nielsen et al. |
| 5,272,475 | A | | 12/1993 | Eaton et al. |
| 5,444,378 | A | | 8/1995 | Rogers |
| 5,631,503 | A | | 5/1997 | Cioffi |
| 5,638,540 | A | | 6/1997 | Aldous |
| 5,651,057 | A | | 7/1997 | Blood et al. |
| 5,769,877 | A | | 6/1998 | Barreras, Sr. |
| 5,850,113 | A | | 12/1998 | Weimer et al. |
| 5,939,860 | A | | 8/1999 | William |
| 6,006,088 | A | * | 12/1999 | Couse .......................... 455/415 |
| 6,104,162 | A | | 8/2000 | Sainsbury et al. |
| 6,104,759 | A | | 8/2000 | Carkner et al. |
| 6,130,518 | A | * | 10/2000 | Gabehart et al. ........... 320/103 |
| 6,184,652 | B1 | * | 2/2001 | Yang ........................... 320/110 |
| 6,211,649 | B1 | * | 4/2001 | Matsuda ...................... 320/115 |
| 6,252,375 | B1 | * | 6/2001 | Richter et al. .............. 320/127 |
| 6,255,800 | B1 | * | 7/2001 | Bork ............................ 320/115 |

FOREIGN PATENT DOCUMENTS

WO    WO 01/01330 A1    1/2001

OTHER PUBLICATIONS

Electric Double–Layer Capacitors, vol. 2, Oct. 25, 1996 (Japan, Tokin Corp., Cat. No. EC–200E).

Supercapacitor: User's Manual, vol. 2 (Japan, Tokin Corp., date unknown).

Charging Big Supercaps, Portable Design, p. 26, Mar. 1997.

* cited by examiner

*Primary Examiner*—Bao Q. Vu
(74) *Attorney, Agent, or Firm*—Jones Day; Krishna K. Pathiyal; Robert C. Liang

(57) ABSTRACT

A system for powering and charging a mobile communication device includes a processing device, a rechargeable battery, a Universal Serial Bus (USB) interface, and a charging subsystem. The rechargeable battery is configured to supply power to the processing device. The USB interface is configured to connect to a USB port via a USB cable. The charging subsystem is coupled to the USB interface, and is configured to charge the rechargeable battery using power received from the USB interface.

44 Claims, 14 Drawing Sheets

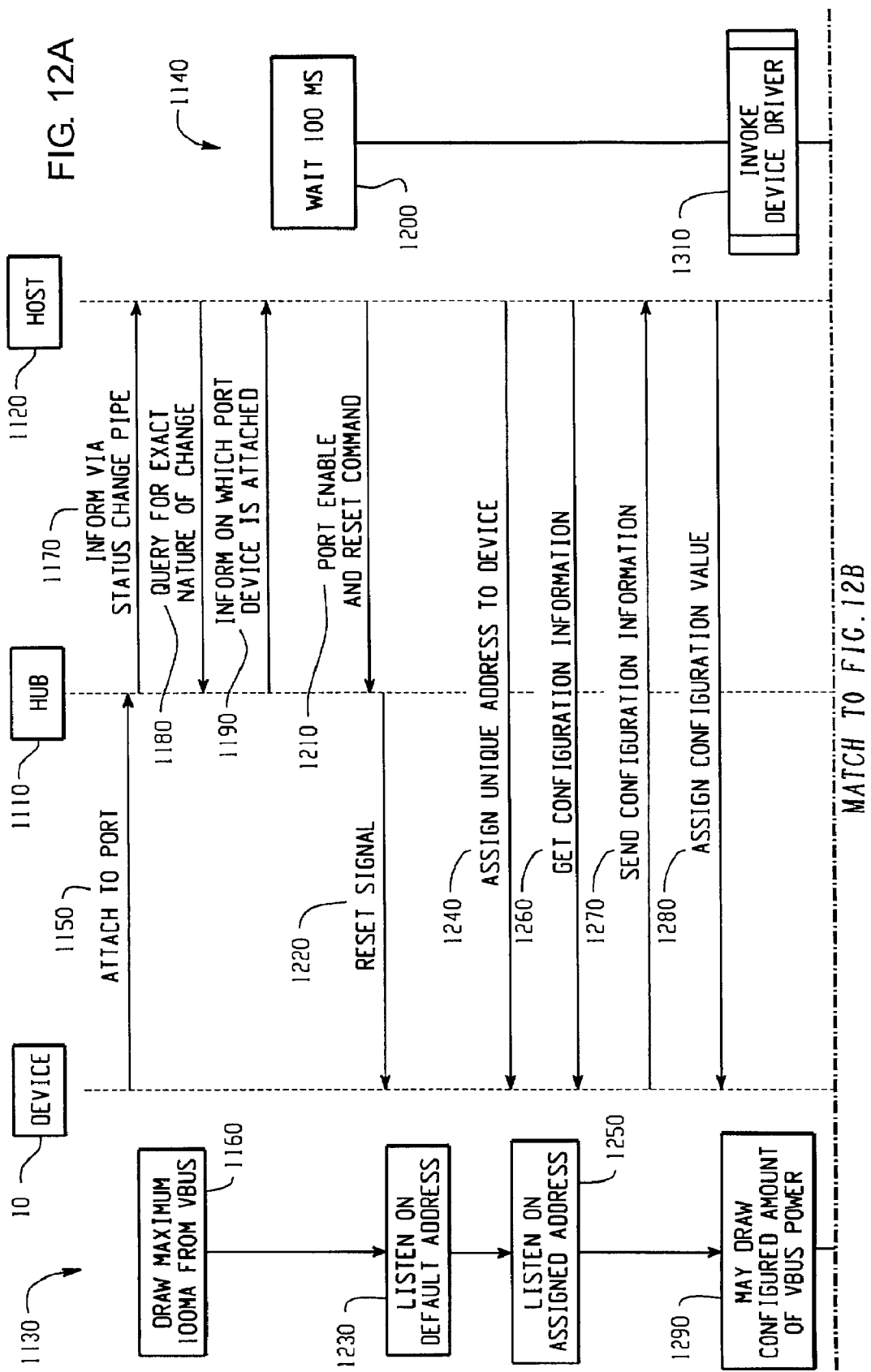

SYSTEM AND METHOD FOR POWERING AND CHARGING A MOBILE COMMUNICATION DEVICE

CROSS-REFERENCE TO RELATED APPLICATION

This application claims priority from and is related to the following prior application: System And Method For Adapting A USB To Provide Power For Charging A Mobile Device, U.S. Provisional Application No. 60/273,021, filed Mar. 1, 2001. This prior application, including the entire written description and drawing figures, is hereby incorporated into the present application by reference.

FIELD OF TECHNOLOGY

This invention relates generally to the field of mobile communication devices. More specifically, a system and method for powering and charging a mobile communication device is provided that utilizes power from a serial bus interface, such as a Universal Serial Bus (USB), as a power source for the mobile communication device.

BACKGROUND

Mobile communication devices that communicate with a host computer through a Universal Serial Bus (USB) port are known. A USB connection is a communications bus that is typically used to connect a USB host to a peripheral device, such as a mobile communication device. A USB host may, for example, be a desktop computer, a laptop computer, or some other USB enabled device. In addition, a USB hub may be used to control USB connections between a plurality of USB hosts and peripheral devices. Both USB peripheral devices and USB hubs may be either self-powered or may obtain power from a USB host (bus-powered). A USB connection generally includes both a high-speed data bus and a power bus, and typically may be coupled to as many as 127 peripheral devices. A bus-powered USB peripheral device obtains its power from a host computer or a USB hub through the power bus in a USB connection. Mobile communication devices, however, generally include a portable power supply, such as a rechargeable battery, and thus typically operate as self-powered USB peripheral devices.

SUMMARY

A system for powering and charging a mobile communication device includes a processing device, a rechargeable battery, a Universal Serial Bus (USB) interface, and a charging subsystem. The rechargeable battery is configured to supply power to the processing device. The USB interface is configured to connect to a USB port via a USB cable. The charging subsystem is coupled to the USB interface, and is configured to charge the rechargeable battery using power received from the USB interface.

DETAILED DESCRIPTION

Figure 1:
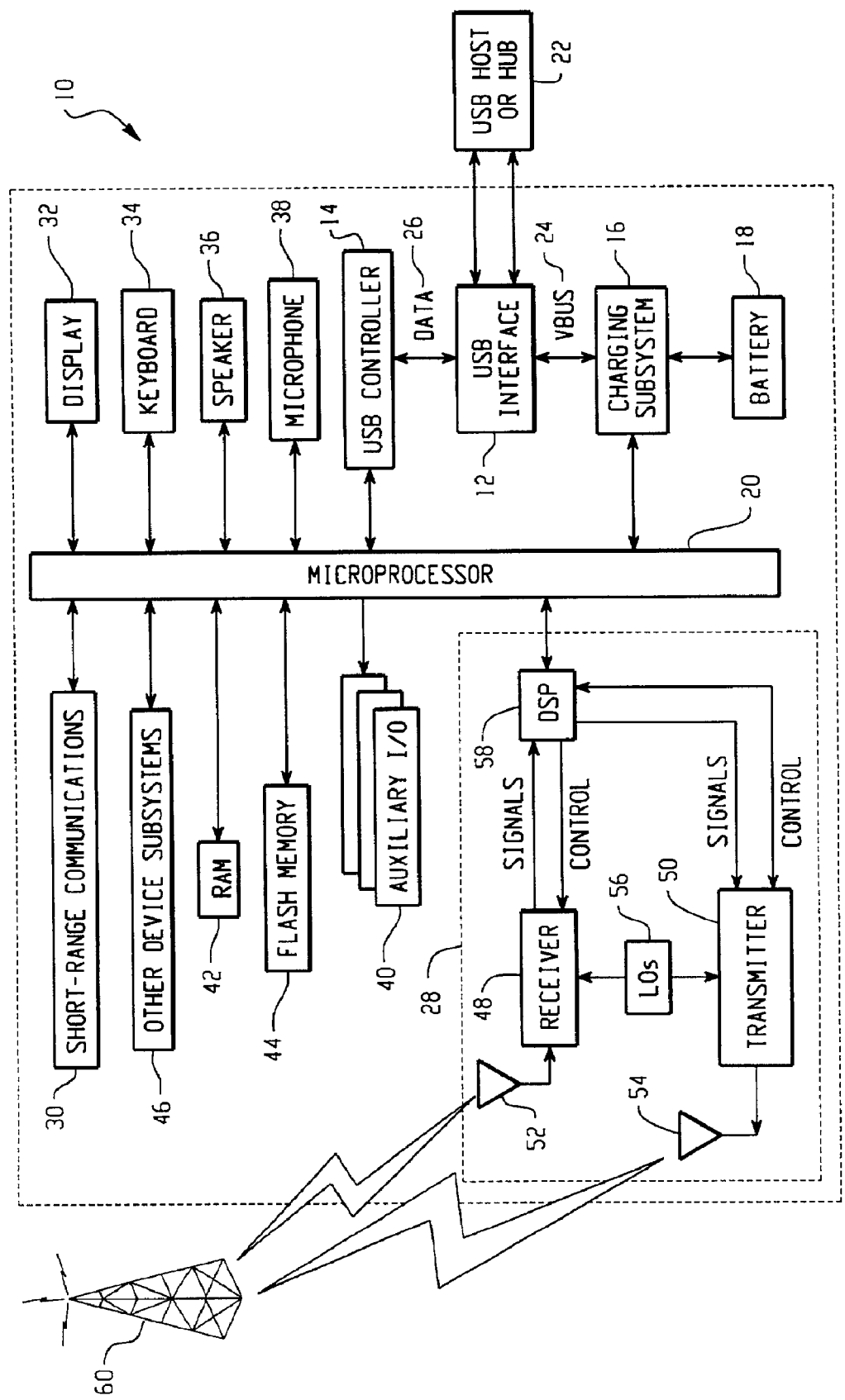
FIG. 1 is a block diagram of an exemplary mobile device that includes a system for drawing power through a serial bus interface, and preferably a USB interface.

Referring now to the drawing figures, FIG. 1 is a block diagram of an exemplary mobile device 10 that includes a system for drawing power through a serial bus interface, and preferably a USB interface 12. Other serial bus interfaces that provide both data and power connections may also be utilized in conjunction with the present invention. The mobile device 10 includes the USB interface 12, a USB controller 14, a charging subsystem 16, a rechargeable battery 18, and a processing device 20.

The USB interface 12 is coupled to a USB host or hub 22 via a USB cable. The USB interface 12 includes a Vbus power line 24 that is coupled to the charging subsystem 16, and USB data lines 26 which are coupled to the USB controller 14. Operationally, the USB interface 12 is used by the mobile device 10 to provide power to the charging subsystem 16, and may also be used to communicate data between the USB host or hub 22 and the USB controller 14.

The charging subsystem 16 provides power to the mobile device 10, either from the rechargeable battery 18 or from the Vbus power line 24, and charges the rechargeable battery 18 from the Vbus power line 24. In addition, the charging subsystem 16 may detect the presence of other associated power circuits, such as an AC adapter or a car adapter, which may alternatively act as power sources to provide power for the device 10 and to charge the battery 18. The operations of the USB interface 12 and charging subsystem 16 are described in detail below with reference to FIGS. 2–13.

If the USB interface 12 provides data communication with the USB host or hub 22, such as in the enumerating embodiment described below with reference to FIG. 3, then the USB controller 14 monitors the USB data lines 26, and controls data communication between the processing device 20 and the USB host or hub 22. In addition to the charging applications described below with reference to FIGS. 2–13, data communication with the USB host 22 preferably enables a mobile device user to set preferences through the USB host device 22 or through software applications operating on the USB host 22, and extends the capabilities of the mobile device 10 by providing a means to download software applications other than through a wireless communication network 60.

In addition to the subsystems and components described above, the mobile device 10 also may include a communications subsystem 28, a short-range communications subsystem 30, input/output devices 32–40, memory devices 42, 44, and various other device subsystems 46. The mobile device 10 is preferably a two-way communication device having voice and data communication capabilities. In addition, the device 10 preferably has the capability to communicate with other computer systems via the Internet.

The processing device 20 controls the overall operation of the mobile device 10. Operating system software executed by the processing device 20 is preferably stored in a persistent store such as a flash memory 44, but may also be stored in other types of memory devices, such as a read only memory (ROM) or similar storage element. In addition, operating system software, specific device applications, or parts thereof, may be temporarily loaded into a volatile store, such as a random access memory (RAM) 42. Communication signals received by the mobile device 10 may also be stored to RAM 42.

The processing device 20, in addition to its operating system functions, enables execution of software applications on the device 10. A predetermined set of applications that control basic device operations, such as data and voice communications, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via the wireless network 60. Preferably, the PIM data items are seamlessly integrated, synchronized and updated via the wireless network 60 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is hereby incorporated into the present application by reference.

Communication functions, including data and voice communications, are performed through the communication subsystem 28, and possibly through the short-range communications subsystem 30. If the mobile device 10 is enabled for two-way communications, then the communication subsystem 28 includes a receiver 48, a transmitter 50, and a processing module 58, such as a digital signal processor (DSP). In addition, the communication subsystem 28, configured as a two-way communications device, includes one or more, preferably embedded or internal, antenna elements 52, 54, and local oscillators (LOs) 56. The specific design and implementation of the communication subsystem 28 is dependent upon the communication network 60 in which the mobile device 10 is intended to operate. For example, a device 10 destined for a North American market may include a communication subsystem 28 designed to operate within the Mobitex™ mobile communication system or DataTAC™ mobile communication system, whereas a device 10 intended for use in Europe may incorporate a General Packet Radio Service (GPRS) communication subsystem.

Network access requirements vary depending upon the type of communication system 60. For example, in the Mobitex™ and DataTAC™ networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 60. Signals received by the antenna 52 through the communication network 60 are input to the receiver 48, which may perform such common receiver functions as signal amplification, frequency down conversion, filtering, channel selection, and analog-to-digital conversion. Analog-to-digital conversion of the received signal allows the DSP to perform more complex communication functions, such as demodulation and decoding. In a similar manner, signals to be transmitted are processed by the DSP 58, and are the input to the transmitter 50 for digital-to-analog conversion, frequency up-conversion, filtering, amplification and transmission over the communication network 60 via the antenna 54.

In addition to processing communication signals, the DSP 58 provides for receiver 48 and transmitter 50 control. For example, gains applied to communication signals in the receiver 48 and transmitter 50 may be adaptively controlled through automatic gain control algorithms implemented in the DSP 58.

In a data communication mode, a received signal, such as a text message or web page download, is processed by the communication subsystem 28 and input to the processing device 20. The received signal is then further processed by the processing device 20 for output to a display 32, or alternatively to some other auxiliary I/O device 40. A device user may also compose data items, such as e-mail messages, using a keyboard 34, such as a QWERTY-style keyboard, and/or some other auxiliary I/O device 40, such as a touchpad, a rocker switch, a thumb-wheel, or some other type of input device. The composed data items may then be transmitted over the communication network 60 via the communication subsystem 28.

In a voice communication mode, overall operation of the device 10 is substantially similar to data communication mode, except that received signals are output to a speaker 36, and signals for transmission are generated by a microphone 38. Alternative voice or audio I/O subsystems, such as a voice message recording subsystem, may also be implemented on the device 10. In addition, the display 32 may also be utilized in voice communication mode, for example to display the identity of a calling party, the duration of a voice call, or other voice call related information.

The short-range communications subsystem 30 enables communication between the mobile device 10 and other proximate systems or devices, which need not necessarily be similar devices. For example, the short-range communications subsystem 30 may include an infrared device and associated circuits and components, or a Bluetooth™ communication module to provide for communication with similarly-enabled systems and devices.

Figure 2:
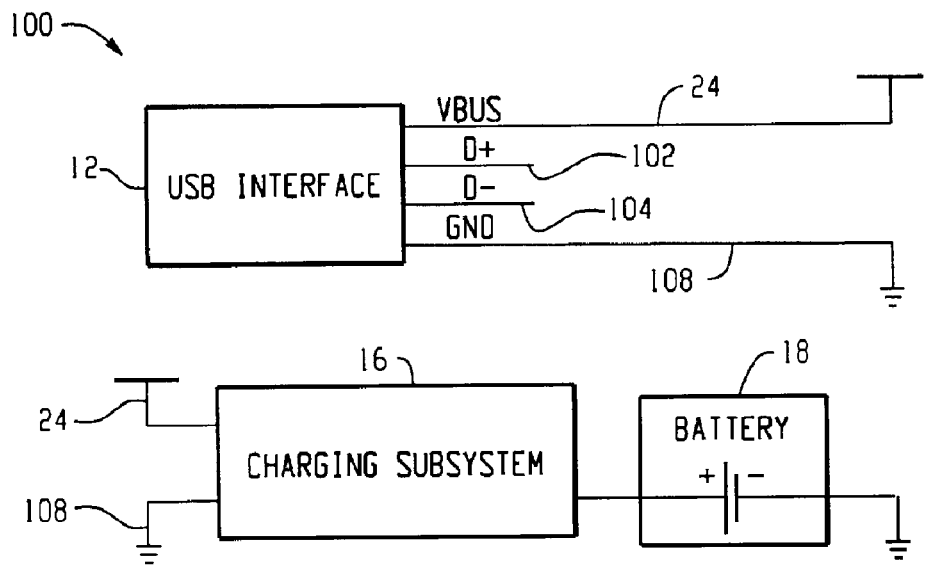
FIG. 2 is a block diagram illustrating a non-enumerating embodiment of the USB interface and the charging subsystem for the mobile communication device shown in FIG. 1.

FIG. 2 is a block diagram illustrating a non-enumerating embodiment 100 of the USB interface 12 and the charging subsystem 16 for the mobile communication device 10. In this embodiment 100, the rechargeable battery 18 in the mobile communication device 10, such as a Lithium Ion (Li—Ion) battery, is charged using the power available through a high-power USB port.

The USB interface 12 includes a D+ data line 102, a D− data line 104, a Vbus power line 24, and a GND power line 108 that are each coupled to corresponding data and power lines in a USB host or hub 22 via a USB cable. In this non-enumerating embodiment 100, however, the USB interface 12 is used solely to provide power to the charging subsystem 16, thus the D+ and D− data lines 102, 104 are not utilized. The Vbus 24 and GND 108 power lines are coupled to the charging subsystem 16, and are used by the charging subsystem 16 to charge the rechargeable battery 18, and possibly to provide operating power to other systems in the mobile communication device 10. A detailed description of the charging subsystem 18 is provided below with reference to FIG. 5.

It was determined experimentally that current may be drawn from several USB ports at a high rate, such as 490 mA, without adversely affecting the USB host or hub 22. As used in this description and in the appended claims, a high-power USB port is a USB port which can provide about 500 mA. A typical way of providing a high-power USB port is to ensure that a single USB device, such as a mobile communication device 10, is the only USB device attached to the USB port of a USB host or hub 22.

Operationally, the charging subsystem 16 measures an open voltage value on the USB interface 12 prior to initiating a charging operation. This open voltage value is typically around 5.16V. The charging subsystem 16 then charges the rechargeable battery 18 by drawing current, typically around 490 mA, from the USB interface 10. The charging subsystem 16 may, for example, detect that the rechargeable battery 18 is drawing current from the USB interface 12 by monitoring the voltage value on the Vbus power line 24 and detecting when the voltage settles to a charging voltage value, such as 4.76 V. Then, when the charging subsystem 16 detects that the Vbus power line 24 has returned to its open voltage value, the rechargeable battery 18 is fully or substantially fully charged and the charging operation is complete.

The charging voltage value monitored by the charging subsystem 16 may also be utilized to detect the type of USB host 22. For instance, when charging from the USB port of a portable computer, such as a laptop, the Vbus voltage value will typically settle to a charging voltage of about 4.65 V. In comparison, the charging voltage of a desktop computer will typically settle to around 4.76 V, as described above.

Figure 3:
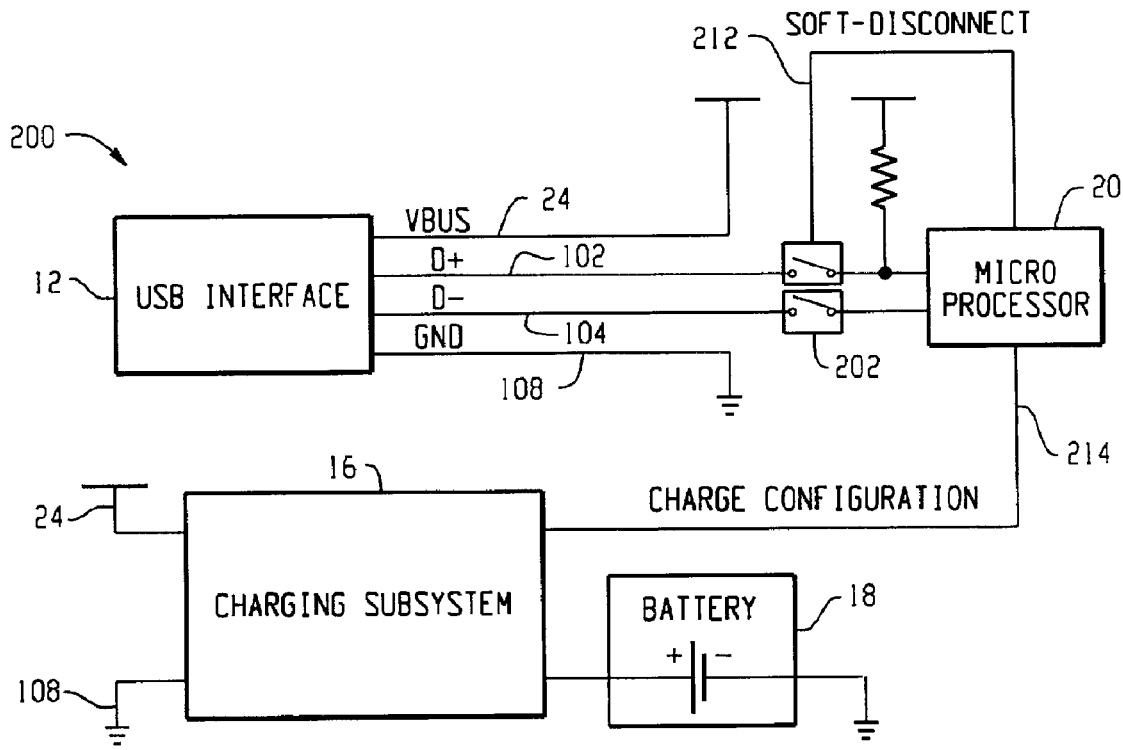
FIG. 3 is a block diagram illustrating an enumerating embodiment of the USB interface and the charging subsystem for the mobile communication device shown in FIG. 1.

FIG. 3 is a block diagram illustrating an enumerating embodiment 200 of the USB interface 12 and the charging subsystem 16 for the mobile communication device 10. The enumerating embodiment 200 includes the USB interface 12, the charging subsystem 16, a soft-disconnect switch 202, the processing device 20, and the rechargeable battery 18.

The USB interface 12 in this embodiment 200 is configured to operate in two modes: a charging mode and a data communications mode. In the data communications mode, the USB interface 12 is used to establish a typical USB data connection between the mobile communication device and a USB host device 22. A person skilled in the art knows the operation of the USB interface 12 in data communications mode. In the charging mode, the USB interface 12 operates as a bus-powered peripheral interface, preferably obtaining the maximum amount of current from the USB host or hub 22.

The USB interface 12 includes a D+ data line 102, a D− data line 104, a Vbus power line 24, and a GND power line 108 that are each coupled to corresponding data and power lines in the USB host or hub 22 via a USB cable. The Vbus power line 24 and the GND power line 108 are coupled to the charging subsystem 16 to supply power to the rechargeable battery 18. The D+ and D− data lines 102, 104 are coupled to the processing device 20 through the soft-disconnect switch 202. The soft-disconnect switch 202 may be any suitable type of electrically controlled switch or switches, such as a relay or a plurality of transistors. The D+ an D− data lines 102, 104 provide data communication between the USB controller 14 (see FIG. 1) and the processing device 20.

While in charging mode, the processing device 20 generates a soft-disconnect signal 212 to control the soft-disconnect switch 202, and also generates a charge configuration signal 214 that is coupled to the charging subsystem 16. As described in more detail below with reference to FIG. 5, the charge configuration signal 214 controls the power supplied by the charging subsystem 16 to the rechargeable battery 18.

Figure 4:
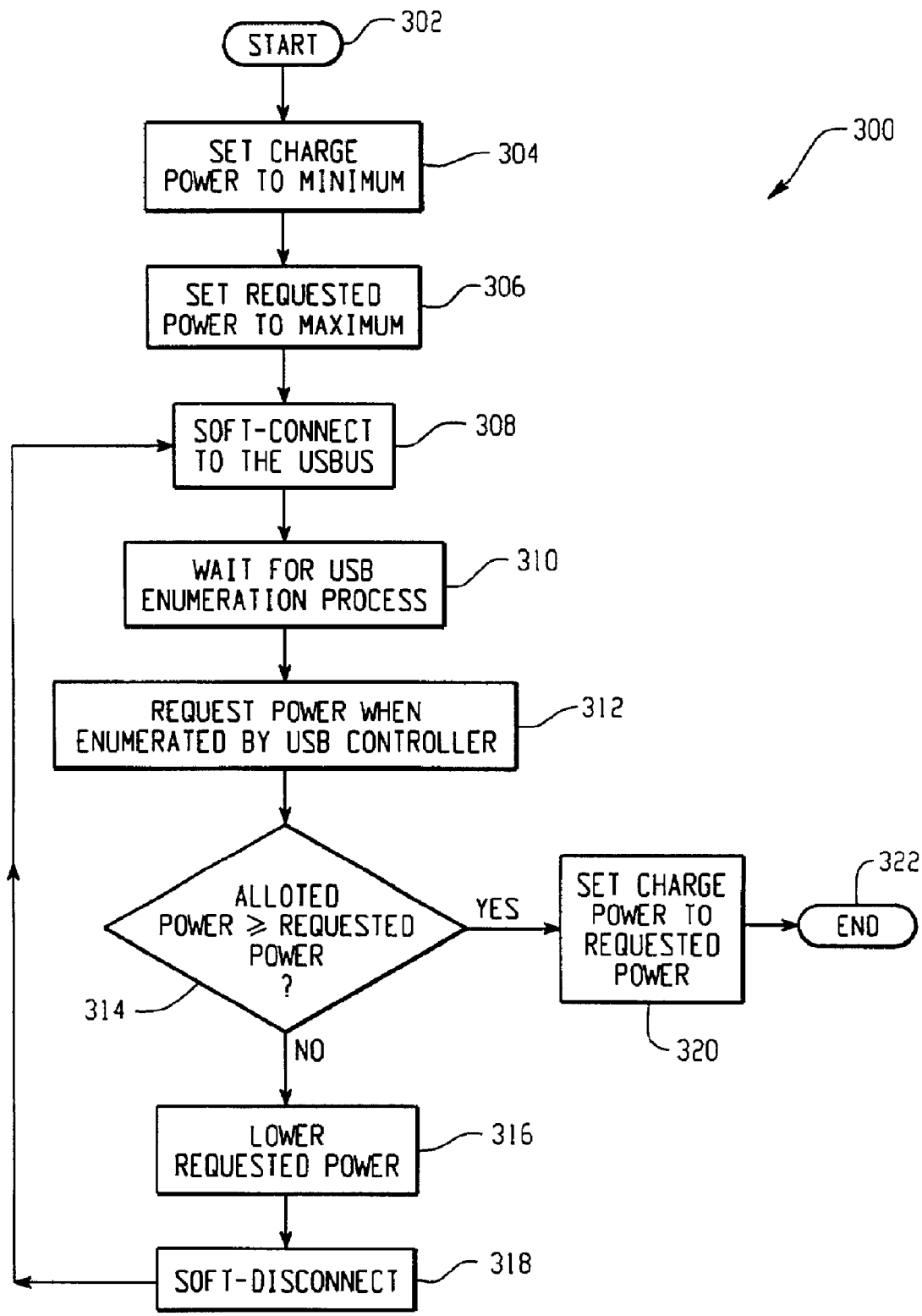
FIG. 4 is a flow diagram illustrating the operation of the enumerating embodiment illustrated in FIG. 3 when the USB interface is in charging mode.

FIG. 4 is a flow diagram 300 illustrating the operation of the enumerating embodiment 200 illustrated in FIG. 3 when the USB interface 12 is in charging mode. The operation begins at step 302. At step 304, the processing device 20 sets the charge configuration signal 214 to a minimum value, such as 0 mA. At step 306, the processing device 20 sets a power request value for the USB host or hub 22 to a maximum level, such as 500 mA. Once these values have been initialized by the processing device 20, the soft-disconnect signal 212 is generated at step 308. The soft-disconnect signal 212 causes the soft-disconnect switch 202 to reset (disconnect and reconnect) the connection between the processing device 20 and the data lines 102, 104, which results in the USB controller 14 (see FIG. 1) detecting a new connection to the USB interface 12.

After the soft-disconnect signal 212 has been generated, the processing device 20 monitors the D+ and D− data lines 102, 104 at step 310, and waits for a signal from the USB host or hub 22 indicating the beginning of the enumeration process (see FIGS. 11 and 12 below). Once enumeration has begun, the USB host or hub 22 obtains the power request value from the processing device 20 through the USB interface 12, and allots a power level for the Vbus power line 24 to the mobile device 10. At step 314, the processing device 20 determines whether the allotted power from the USB host or hub 22 is greater than or equal to the power request value. If the allotted power is less than the power request value, then the processing device 20 lowers the power request value by a predetermined amount at step 316, and generates another soft-disconnect signal 212 at step 318. The soft-disconnect signal 212 then causes the process steps, beginning at step 308, to repeat with the lower power request value. Once the allotted power is greater than or equal to the requested power, then the processing device 20 then sets the charge configuration 214 to indicate the allotted power (step 320) and the operation is complete (step 322). The allotted power on the Vbus power line 24 may then be used by the charging subsystem 16 to supply power to the rechargeable battery 18.

Figure 5:
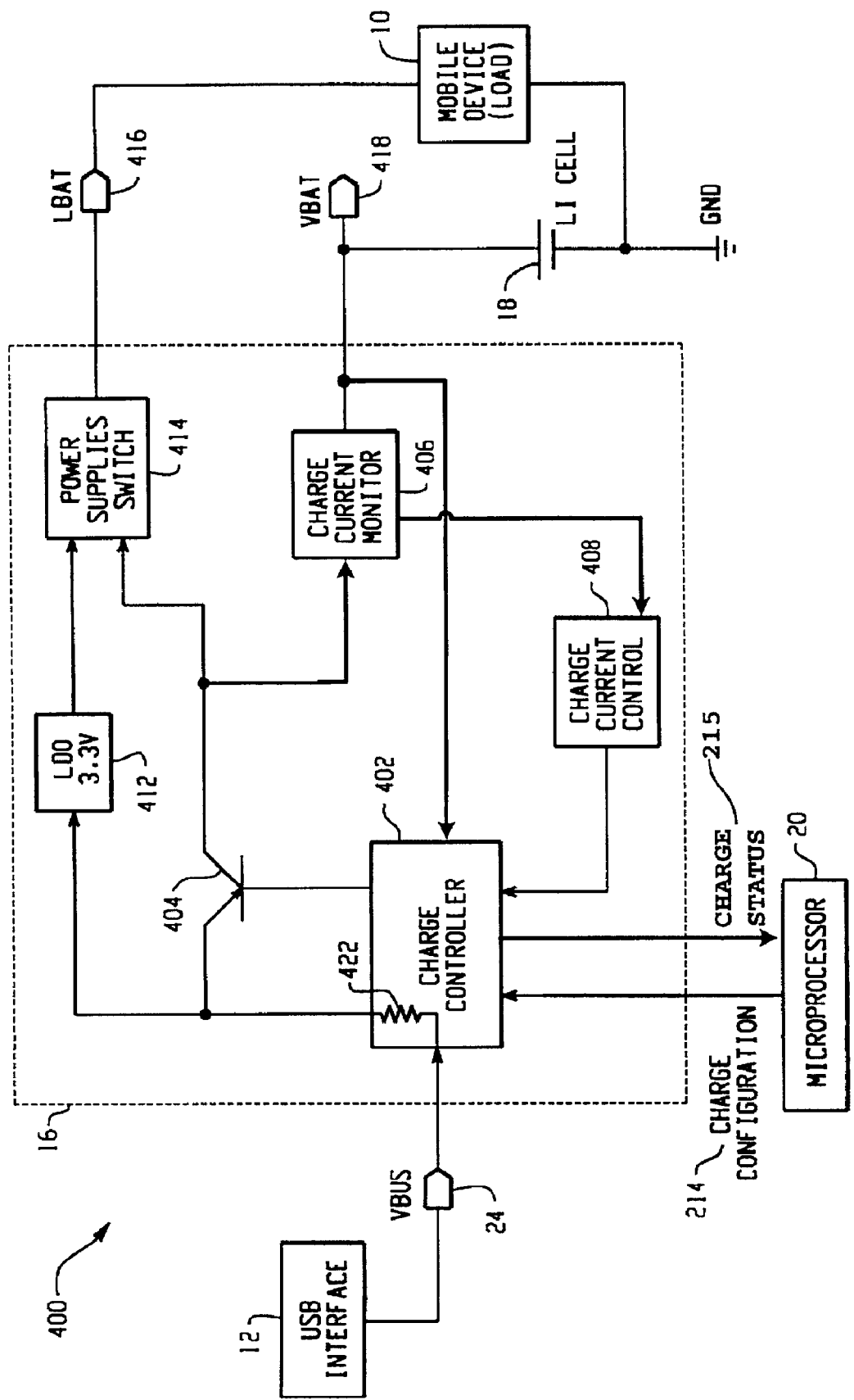
FIG. 5 is a block diagram showing an expanded view of the charging subsystem for the mobile communication device.

FIG. 5 is a block diagram 400 showing an expanded view of the charging subsystem 16 for the mobile communication device 10. The charging subsystem 16 may include a charge controller 402, a transistor 404, a charge current monitor 406, and a charge current controller 408. In addition, the charging subsystem 16 may include a charging subsystem processor, such as for example mobile device microprocessor 20, a voltage regulator 412, and a power supplies switch 414. Also shown are the USB interface 12, the rechargeable battery 18, the processing device 20, and a block illustrating the mobile device 10 as a load to the charging subsystem 16.

The charging subsystem 16, including the charge controller 402 and the power supplies switch 414, is controlled by a charging subsystem processor, which may be any suitable type of processing device, such as a microprocessor or a digital signal processor (DSP). As illustrated in the example embodiment of FIG. 5, processing device 20 provides the charging subsystem processor function. The charge controller 402 receives the charge configuration 214 from the processing device 20, and signals charge status 215 back to the processing device 20. If the USB interface 12 is an enumerating embodiment 200, as described above with reference to FIGS. 3 and 4, then the charge configuration 214 controls the power allotment during the enumeration process. In addition, the charge configuration 214 may control other functions and/or features of the charging subsystem 16, such as the low power and fast (high power) charging modes described below with reference to FIGS. 9 and 10. An exemplary method for establishing the charge configuration 214 is described below with reference to FIG. 11.

Power to the mobile device 10 is supplied by the LBat terminal 416, which is an output from the power supplies switch 414. The main power source for the mobile device 10 is the rechargeable battery 18, which is coupled to the LBat terminal 416 through the power supplies switch 414 during normal operation. When the rechargeable battery 18 has an insufficient charge or has been removed, however, the power supplies switch 414 couples the mobile device 10 to the voltage regulator 412 in order to supply power from the USB interface 12. The voltage regulator 412 is preferably a low drop-out (LDO) regulator configured to supply a substantially constant voltage, such as about 3.3 Volts. Power to the voltage regulator 412 is supplied from the Vbus power line 24 through a serial resistor 422, which preferably has a very low resistance value, such as about 0.06 Ohms. The operation of the power supplies switch 414 is described in more detail below with reference to FIG. 6.

During charging mode, the charge controller 402, transistor 404, charge current monitor 406, and charge current controller 408 regulate the power supplied to the rechargeable battery 18 from the USB interface 12. The transistor 404, preferably a PNP bipolar transistor, is coupled to the charge controller 402 at its base terminal, and couples the Vbus power line 24 to the rechargeable battery 18 through its current carrying terminals. The charge current monitor 406 is coupled between the collector terminal of the transistor 404 and the rechargeable battery 18, and provides a charge current signal to the charge current control 408 analogous to the current being provided to the rechargeable battery 18. The charge current controller 408 generates a control signal that is coupled to the charge controller 402. The control signal from the charge current controller 408 is used by the charge controller 402 to control the amount of current passing through the current-carrying terminals of the transistor 404 such that the current does not exceed that required by the system. In addition, the charge controller 402 monitors the voltage level of the rechargeable battery 18, Vbat 418, and controls the current passing through the transistor 404 such that Vbat 418 does not exceed the specified maximum. The operation of the charging subsystem 16 during charging mode is described below in more detail with reference to FIGS. 7–11. Optionally, charge controller 402 also monitors the voltage at Vbat 418 directly, for instance to report charge status 215.

Figure 6:
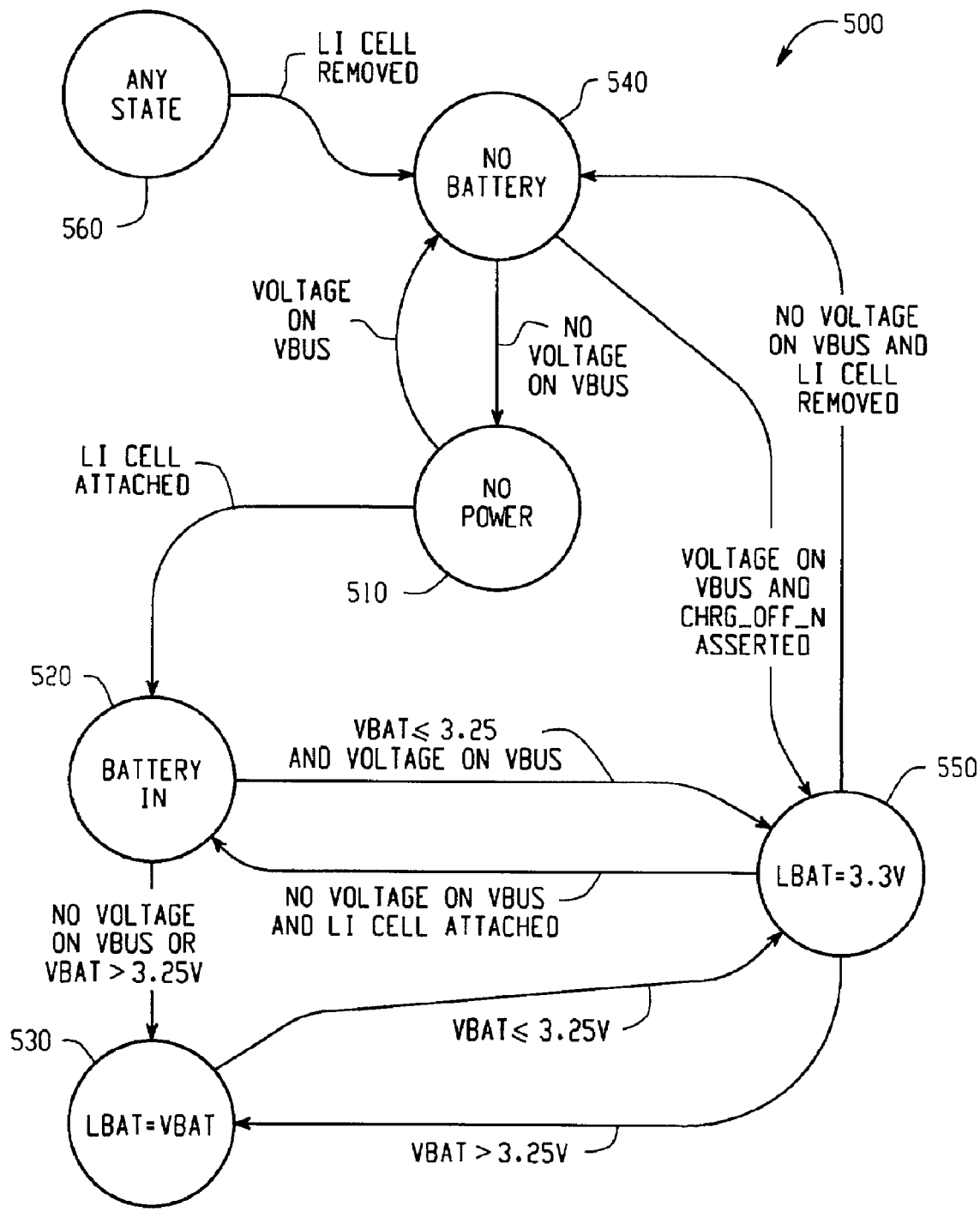
FIG. 6 is a state diagram illustrating an exemplary method of operation for the power supplies switch shown in FIG. 5.

FIG. 6 is a state diagram 500 illustrating an exemplary method of operation for the power supplies switch 414 shown in FIG. 5. At state 510, the mobile device 10 has no power, i.e., the rechargeable battery 18 has either lost its charge or has been removed and there is no external power from the USB interface 12. During this "no power" state 510, the voltage level of the rechargeable battery, Vbat 418, is about 0V, and no valid voltage is present on the Vbus power line 24.

At state 520, the rechargeable battery 18 has been inserted into the mobile device 10, and a voltage is thus present on the Vbat terminal 418. During this state 520, the charging subsystem 16 detects the voltage at the Vbat terminal 418 and determines if the charge remaining in the rechargeable battery 18 is above a threshold level, such as 3.25 V. The threshold level is preferably set at a voltage above which the rechargeable battery 18 will optimally power the mobile device 10. If the voltage detected at the Vbat terminal 418 is above the threshold level, then the charging subsystem 16 transitions to state 530, wherein the power supplies switch 414 couples the rechargeable battery 18 to the Lbat terminal 416 to power the mobile device 10 from the rechargeable battery 18.

If at state 520 the voltage at the Vbat terminal 418 is at or below the threshold level, then the charging subsystem 16 detects whether a sufficient voltage, such as 4.56V, is present on the Vbus power line 24. If sufficient power is available on the Vbus power line 24, then the charging subsystem 16 transitions to state 550, wherein the power supplies switch 414 couples the Lbat terminal 416 to the voltage regulator 412 in order to power the device 10 from the USB interface 12. The distribution of power to the mobile device 10 from the USB interface 12 is described in more detail below with reference to FIG. 13. If no sufficient voltage is detected on the Vbus power line 429, however, then the charging subsystem 16 transitions to state 530 in order to power the mobile device 10 from the depleted battery 18.

At state 540, the rechargeable battery 18 has been removed from the mobile device 10. The charging subsystem 16 may transition to this "no battery" state 540 from any of the other states, represented in the diagram 500 by the "any state" location 560. In the "no battery" state 540, the charging subsystem 16 detects whether a sufficient voltage is present on the Vbus power line 24. If a sufficient voltage is available, then the charging subsystem 16 transitions to state 550, wherein the power supplies switch 414 couples the Lbat terminal 416 to the voltage regulator 412. If there is not sufficient power on the Vbus power line 24, however, then the charging subsystem 16 transitions to the "no power" state 510.

When the charging subsystem 16 is in state 550, power is supplied to the mobile device 10 from the USB interface 12 through the voltage regulator 412. During this state, the rechargeable battery 18 is charged if the charging subsystem 16 is in charging mode, as described below with reference to FIGS. 7–11. If the battery 18 is charging in state 550, and the voltage at the Vbat terminal 418 rises above the threshold, then the charging subsystem 16 transitions to state 530 to power the mobile device 10 from the fully charged battery 18.

Figure 7:
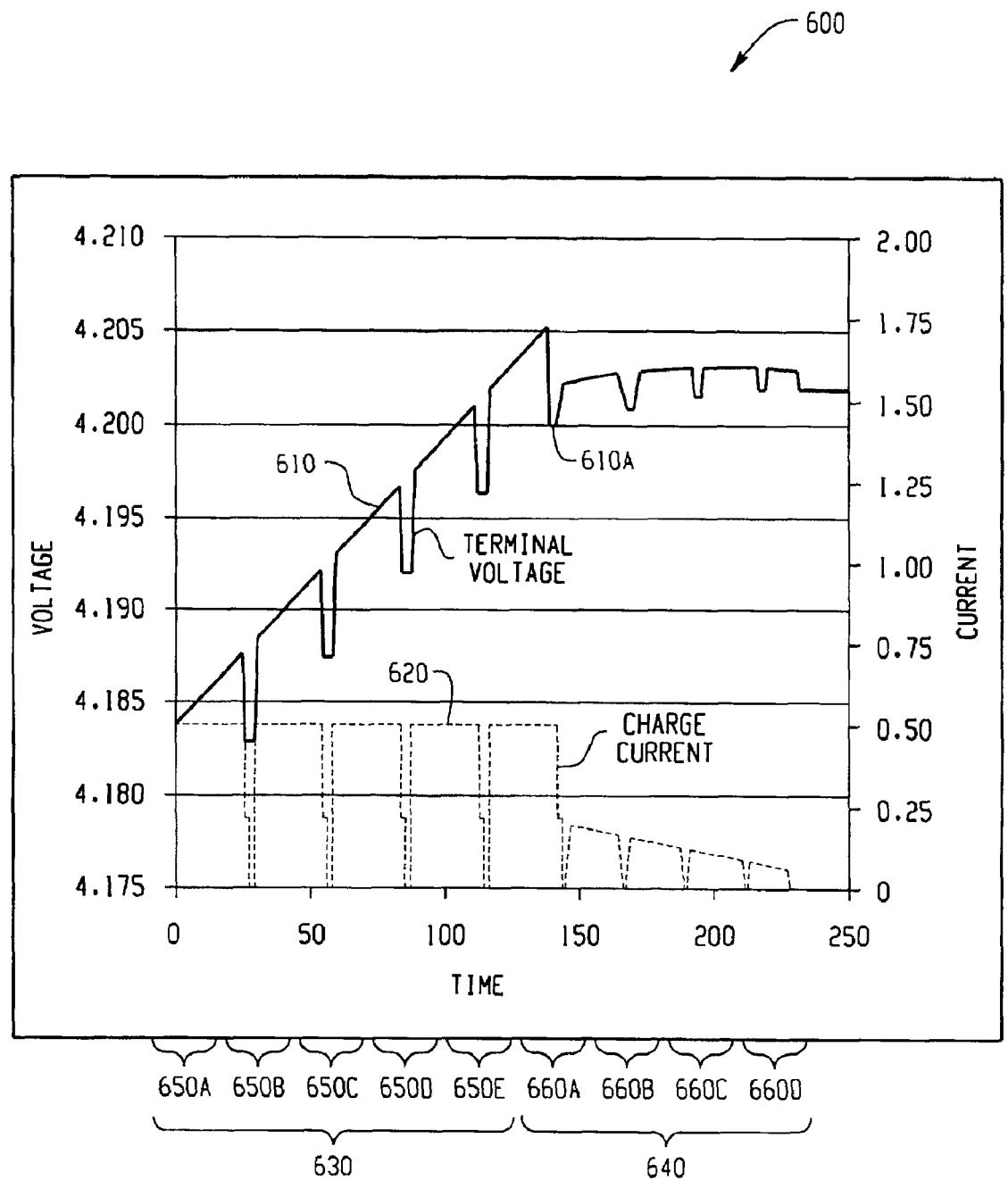
FIG. 7 is a graph illustrating an exemplary charging method for the charging subsystem shown in FIG. 5.

FIG. 7 is a graph 600 illustrating an exemplary charging method for the charging subsystem 16 shown in FIG. 5. The graph 600 includes a battery voltage curve 610 and a battery current curve 620. The battery voltage curve 610, illustrated by a solid line on the graph 600, depicts the voltage supplied to the Vbat terminal 418 by the charging subsystem 16 during charging mode, plotted as a function of time. Similarly, the battery current curve 620, illustrated by a dotted line on the graph 600, depicts the current supplied to the rechargeable battery 18 during charging mode, plotted as a function of time. The voltage values for the battery voltage curve 610 are illustrated along the y-axis on the left-hand side of the graph 600, and the current values for the battery current curve 620 are illustrated along the y-axis on the right-hand side of the graph 600. It should be understood, however, that the current, voltage, and time values shown on the graph 600 are for illustrative purposes only, and are not intended to limit the charging method to these specific values. Although not expressly shown in the drawing, it is contemplated that constant current, constant voltage, constant power, programmable constant current, and pulse current may be used independently or in combination to provide. a multiple mode charging operation. The exemplary case of a multiple mode charging operation consisting of constant current combined with constant voltage has been illustrated, and will be described next in greater detail.

The exemplary charging method is divided into two charging periods: a constant current period 630, and a constant voltage period 640. In addition, the constant current period 630 is divided into a plurality of constant current cycles 650A–650E, and the constant voltage period 640 is divided into a plurality of constant voltage cycles 660A–660D.

During the constant current period 630, the charge controller 402 regulates the amount of current passing through the current-carrying terminals of the transistor 404 (FIG. 5) in order to supply a constant charge current to the rechargeable battery 18. Between each constant current cycle 650, the charge controller 402 stops the charge current, and measures the battery voltage 610. The constant current period 630 continues until the measured battery voltage 610 rises above a critical threshold level 610A. For instance, in the illustrated embodiment the constant current period 630 continues until the charge controller 402 measures a battery voltage 610A of about 4.2 V.

Once the measured battery voltage 610 rises above the critical threshold level 610A, then the charging subsystem 16 enters the constant voltage period 640. During the constant voltage period 640, the charge controller 402 regulates the charge current passing through the current carrying terminals of the transistor 404 so that the battery voltage 610 maintains a constant or substantially constant voltage level. Thus, as the battery 18 continues to charge, the current 620 supplied by the transistor 404 is reduced. During each constant voltage cycle 660, the charge current monitor 406 measures the current 620 supplied to the rechargeable battery 18, and when the sampled current 620 reaches a pre-determined level, such as 50 mA, then the charging method is complete.

Figure 8:
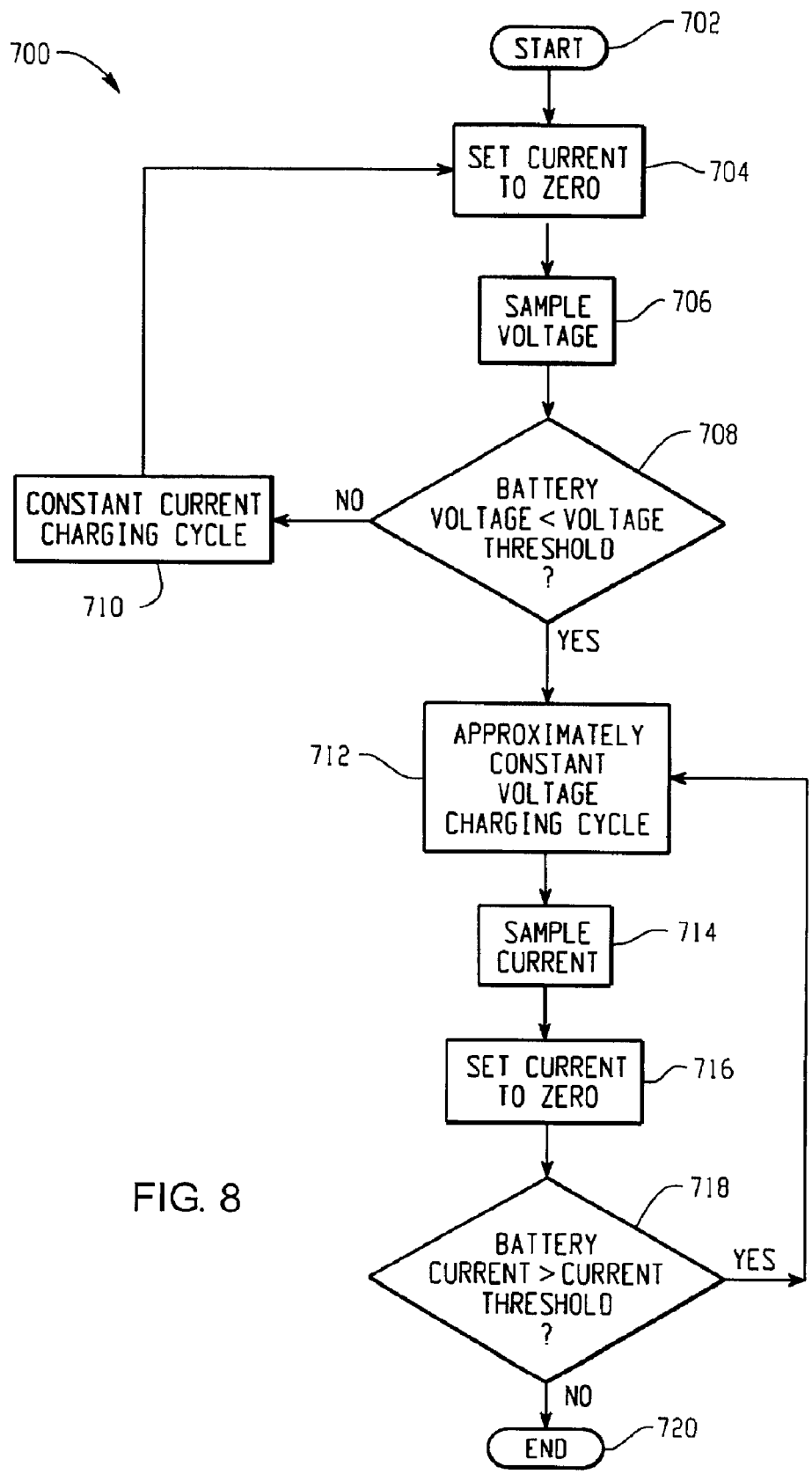
FIG. 8 is a flow diagram further illustrating the exemplary charging method shown in FIG. 7.

FIG. 8 is a flow diagram 700 further illustrating the exemplary charging method shown in FIG. 7. The method begins at step 702. The constant current period 630 is illustrated by steps 704–710. At step 704, a constant current cycle 650 is complete and the charge current 620 is set to zero by the charge controller 402. Then, with the charge current 620 set to zero, the charge voltage 610 is measured by the charge controller 402 at step 706. If the battery voltage 610 is above the critical threshold level 610A (step 708), then the charging subsystem 16 enters the constant voltage period 640, illustrated by steps 712–718. If the battery voltage 610 is at or below the critical threshold level 610A, however, then the constant charge period 630 continues at step 704.

Once the charging subsystem 16 enters the constant voltage period 640 at step 712, the charge controller 402 maintains a constant or substantially constant voltage level 610 at the Vbat terminal 418 by controlling the current 620 passing through the transistor 404. At step 714, the charge current monitor 406 samples the current 620 supplied to the battery 18, preferably just before the completion of a constant voltage cycle 660. Then at step 716, a constant voltage cycle 660 completes and the current 620 is set to zero by the charge controller 402. At step 718, the charging subsystem 16 determines if the sampled current value (step 714) is greater than a pre-determined current level. If the sampled current is above the pre-determined threshold, then the constant voltage period 640 continues at step 712. If the sampled current 620 is at or below the pre-determined threshold, however, then the battery 18 is charged and the charging method 700 ends at step 720.

Figure 9:
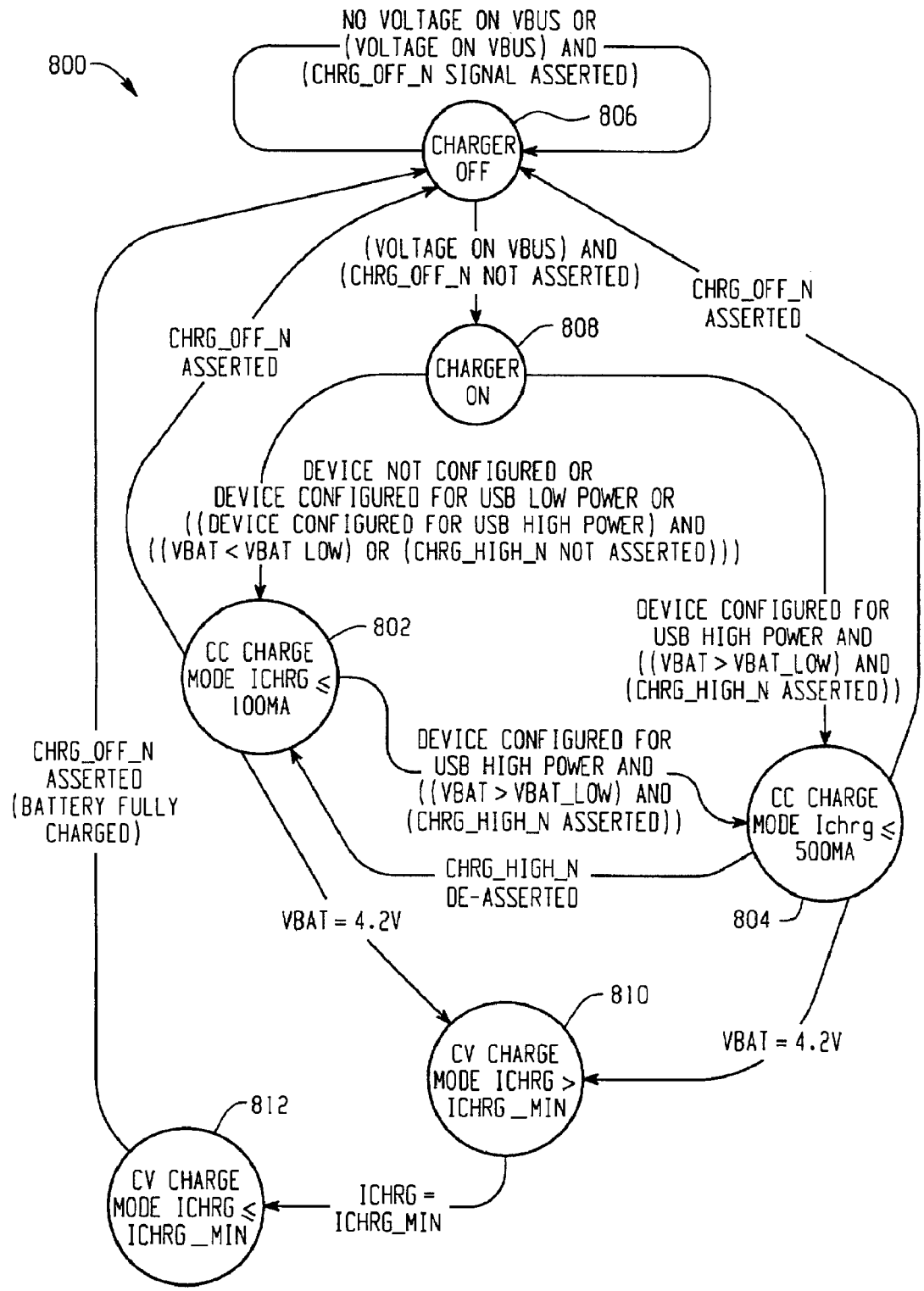
FIG. 9 is a state diagram illustrating an exemplary charging method for the charging subsystem shown in FIG. 5 that includes a low power charging mode and a fast charging mode.

FIG. 9 is a state diagram 800 illustrating an exemplary charging method for the charging subsystem 16 shown in FIG. 5 that includes a low power charging mode 802 and a fast charging mode 804. At state 806 the charging subsystem 16 is turned off. This state 806 may occur because no voltage or an insufficient voltage (preferably less than 4.56V) is detected on the Vbus power line 24, or may occur if the charging mode is disabled by a mobile device user.

In accordance with the USB standard, the voltage level on the Vbus power line 24 may be insufficient to power the charging subsystem 16 if the USB interface 12 is attached to a low-power USB port on a bus-powered USB hub. If the charging subsystem 16 remains in the "charger off" state 806 because of insufficient voltage on the Vbus power line 24, then the charger subsystem 16 may display a message on the mobile device 10 indicating that the rechargeable battery 18 cannot be charged.

If there is a sufficient voltage available on the Vbus power line 24 (preferably greater than or equal to 4.56V) and the charging subsystem 16 is enabled, then the charging subsystem 16 transitions from the "charger off" state 806 to a "charger on" state 808. In the "charger on" state 808, the charging subsystem 16 determines whether to begin charging the battery 18 in the constant current, low power charge mode 802 or in the constant current, fast charging mode 804. If the mobile device 10 has already received a USB high power configuration by undergoing the enumeration process described below with reference to FIGS. 11 and 12, then the charging subsystem 16 may transition directly from the "charger on" state 808 to the constant current, fast charging mode 804. This may occur, for example, if the device 10 has not been unplugged from the USB port subsequent to completing enumeration. In addition, before transitioning to the fast charging mode 804 (from any other state) the charging subsystem 16 may require that the fast charging mode 804 be enabled by the mobile device user (CHRG_HIGH_N) and that the rechargeable battery 18 has at least a minimum remaining charge (Vbat_low). For instance, if the voltage at the Vbat terminal 418 is below a minimum threshold level (Vbat_low), such as a value from 2.9V to 3.2V, then the charging subsystem 16 may require the charging process to begin in the low power charging mode 802, even if the enumeration process has been completed.

If the charging subsystem 16 cannot transition directly into the high power charging mode 804, then the charging subsystem 16 transitions from the "charger on" state 808 to the low power, constant current charge mode 802. In the low power, constant current charge mode 802, the charging subsystem 16 applies constant current cycles 650 to charge the battery 18 as described above with reference to FIGS. 7 and 8. In this low power mode 802, however, the charge current 620 is limited to a maximum current value (currently 100 mA) required by the USB standard prior to enumeration. Because of the maximum charge current value, the low power mode 802 enables the charging subsystem 16 to maintain USB compliance while charging from a high-power USB port prior to enumeration or while charging from to a USB low-power port. If a USB high power configuration is achieved during enumeration, then the charging subsystem 16 may transition from the low power charging mode 802 to the fast charging mode 804. As described above, however, a transition to the fast charging mode 804 may also require enablement of the fast charging mode 804 (CHRG_HIGH_N) and/or a minimum power level (Vbat_low) remaining on the rechargeable battery 18.

In the constant current, fast charging mode 804, the charging subsystem 16 applies constant current cycles 650 to charge the battery 18, as described above. The rechargeable battery 18 is charged at a faster rate in this mode 804, however, by applying a charge current 620 up to the maximum current value allotted during enumeration (typically 300 mA to 500 mA). The current available for charging during the fast charge mode 804 equals the total current allotted to the USB interface 12 during enumeration minus any current used to power the mobile device 10.

After the constant current charging period 630 has been completed by either the low power or fast charging modes 802, 804, the charging subsystem 16 transitions to a first constant voltage charge mode 810. During this mode 810, the charging subsystem 16 regulates the current to apply a constant or substantially constant voltage to the rechargeable battery 18, as described above with reference to FIGS. 7 and 8. The charging subsystem 16 remains in the first constant voltage charging mode 810 until the sampled current 620 reaches the pre-determined level (Ichrg_min). Then, the charging subsystem 16 transitions to the second constant voltage charging state 16, which is a transition state to the "charger off" state 806. The microprocessor 20 then generates a signal (CHRG_OFF_N) to turn off the charging mode (state 806), completing the charging operation.

Figure 10A:
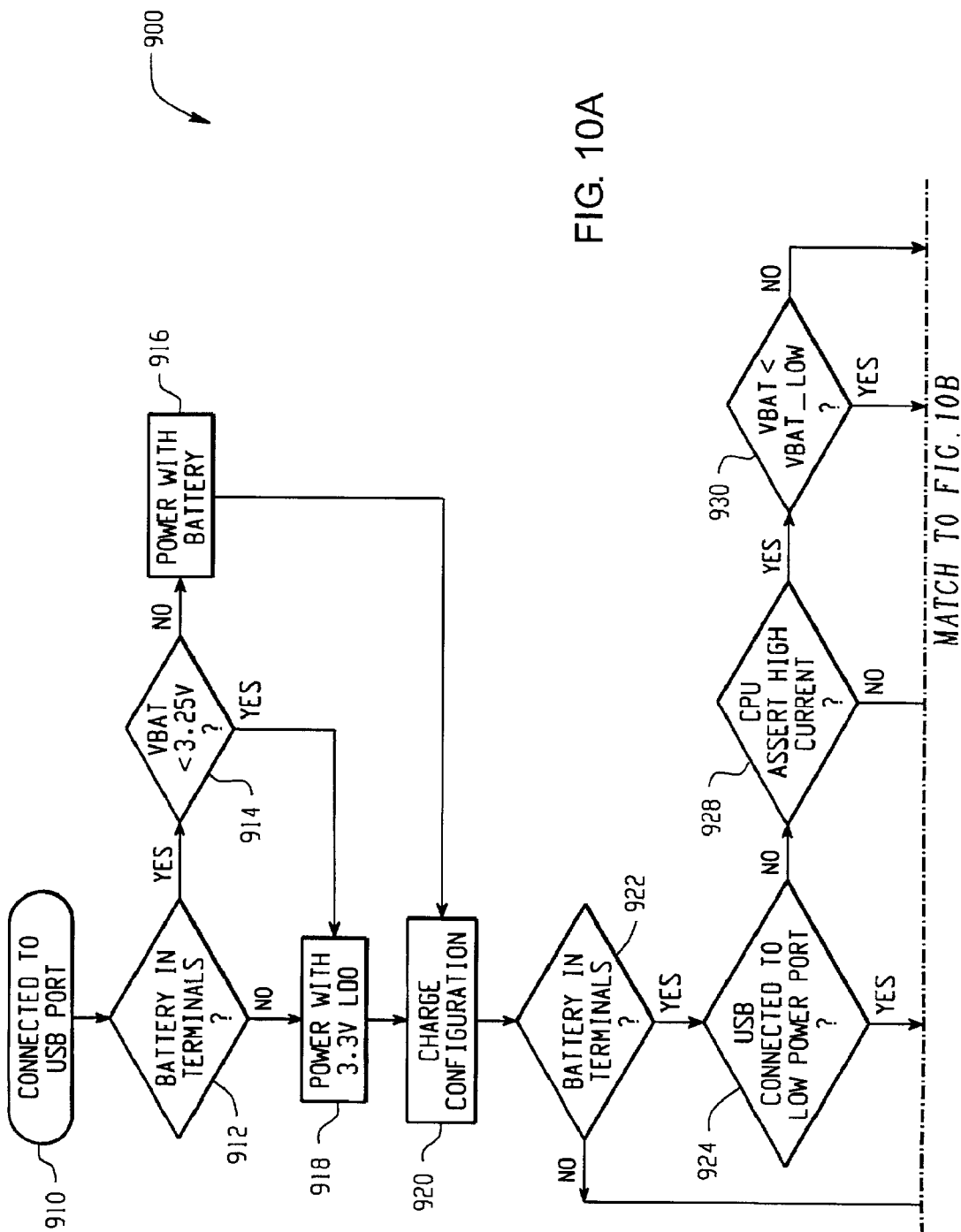
FIG. 10 is a flow diagram further illustrating the charging method shown in FIG. 9.
Figure 10B:
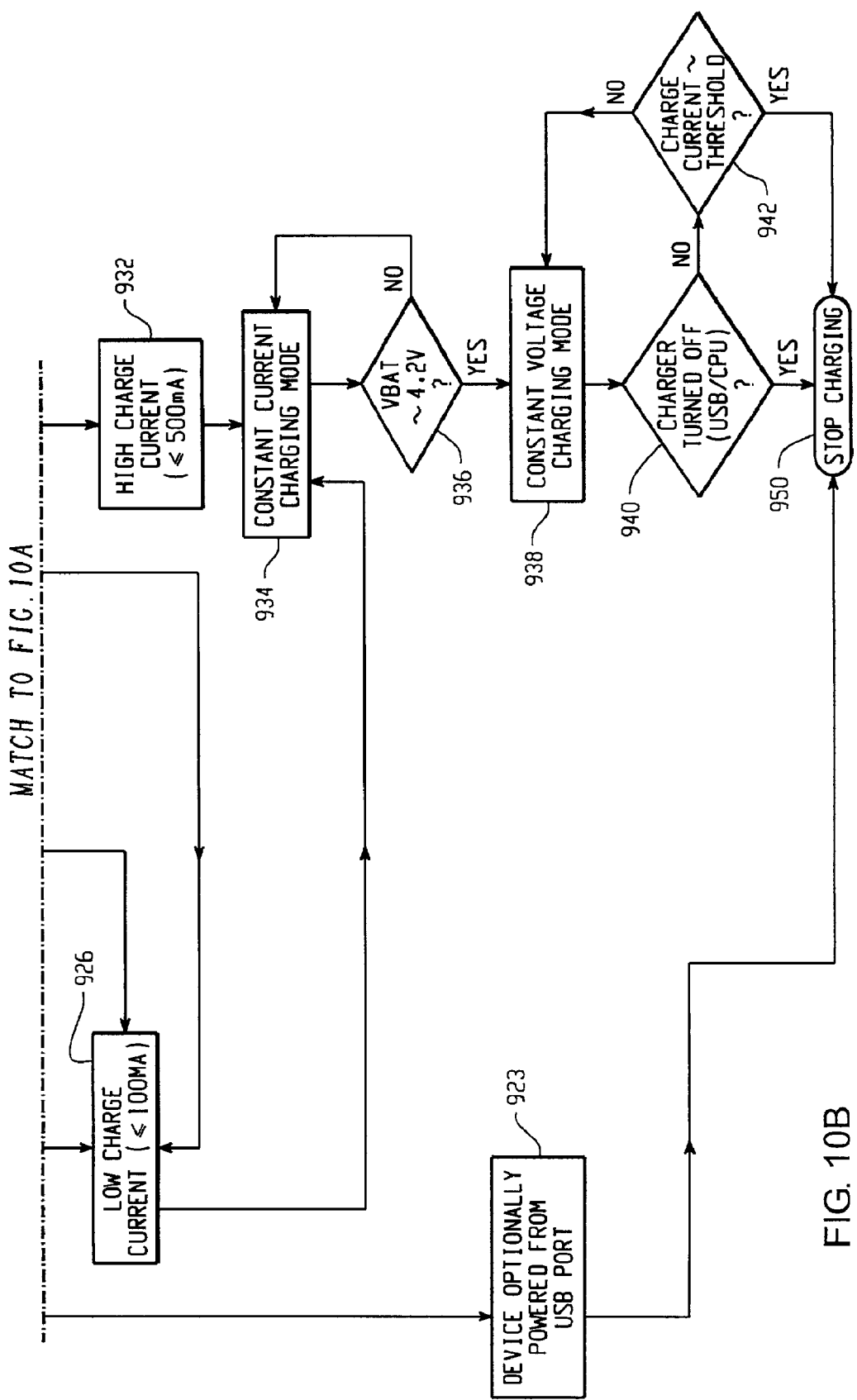

FIG. 10 is a flow diagram further illustrating the charging method shown in FIG. 9. The method begins at step 910 when the mobile device 10 is connected to the USB port of a USB host or hub 22. At step 912, the charging subsystem 16 determines if a rechargeable battery 18 is present in the mobile device 10. If a battery 18 is detected, then at step 914 the charging subsystem determines whether the voltage present at the Vbat terminal 418 is above the threshold level, such as 3.25V, as described above with reference to FIG. 6. If the battery voltage 418 is above the threshold level, then the mobile device 10, including the charging subsystem 16, is powered using the rechargeable battery (step 916). If the battery voltage 418 is below the threshold level (step 914), or if no battery is detected (step 912), then at step 918 the mobile device 10 is powered from the USB interface 12 through the voltage regulator 412. During this mode of operation, the charging subsystem 16 may limit the power supplied to the mobile device 10 to the device systems necessary to charge the battery 18 and perform other USB functions. For instance, non-USB systems such as the communication subsystem 28 may be disabled while the battery 18 remains depleted because of the limited current available from the USB interface 12. The distribution of power form the USB interface 12 is described below with reference to FIG. 13.

At step 920, charge configuration takes place whereby the mobile device 10 undergoes USB enumeration by the USB host or hub 22, and determines the power available from the Vbus power line 24 for charging. This enumeration step 920 is described in more detail below with reference to FIG. 11.

At step 922, the charging subsystem 16 again determines if a rechargeable battery 18 is present in the device 10. If no battery 18 is detected, then the mobile device 10 may be powered from the USB interface (step 923), but the charging mode is discontinued at step 950. If the rechargeable battery 18 is detected, then at step 924 the charging subsystem 16 determines from the charge configuration 214 (step 920) if the device 10 is connected to a USB low power port. If the charge configuration 214 indicates a USB low power port, then at step 926 the charging subsystem sets the charge current for constant current, low power mode by setting the current to a value at or below the maximum current allowed under the USB specification (currently 100 mA).

If the charge configuration 214 indicates that the device 10 is connected to a USB high power port, however, then the charging subsystem 16 determines if the fast charging (high power) mode has been enabled at step 928. Step 928 may, for example, be performed by detecting a high charge current flag (CHRG_HIGH_N) set by the processing device 20. If fast charging mode has not been enabled, then the charging subsystem 16 sets the charging current for constant current, low power mode (step 926). If fast charging mode is enabled, however, then the charging subsystem 16 determines at step 930 if the charge remaining on the rechargeable battery 18, Vbat 416, is below a minimum voltage level (Vbat_low). If the voltage present at the Vbat terminal 416 is below the minimum voltage level (Vbat_low), then the charge current is set for constant current, low power mode at step 926. If the battery voltage 416 detected at step 930 is at or above the minimum voltage level (Vbat_low), however, then the charging subsystem 16 sets the charge current for constant current, fast charging mode in step 932.

At step 934, the charging subsystem 16 enters constant current mode, and charges the rechargeable battery 18 using the current value selected in either step 926 (low current mode) or step 932 (fast charging mode). The charging subsystem 16 remains in constant current mode until, in step 936, the voltage detected at the Vbat terminal 418 at the end of a constant current cycle 650 reaches a critical threshold level 610A, such as 4.2V. Once the critical threshold voltage 610A is reached, then the charging subsystem enters the constant voltage charging mode in step 938. At step 938 a constant voltage is applied to the battery 18 until either the charging function is turned off (either by the CPU or by the USB disconnecting), or until the charge current reaches a minimum threshold (step 942). In either case, when constant voltage charging ends, charging stops at step 950.

Figure 11:
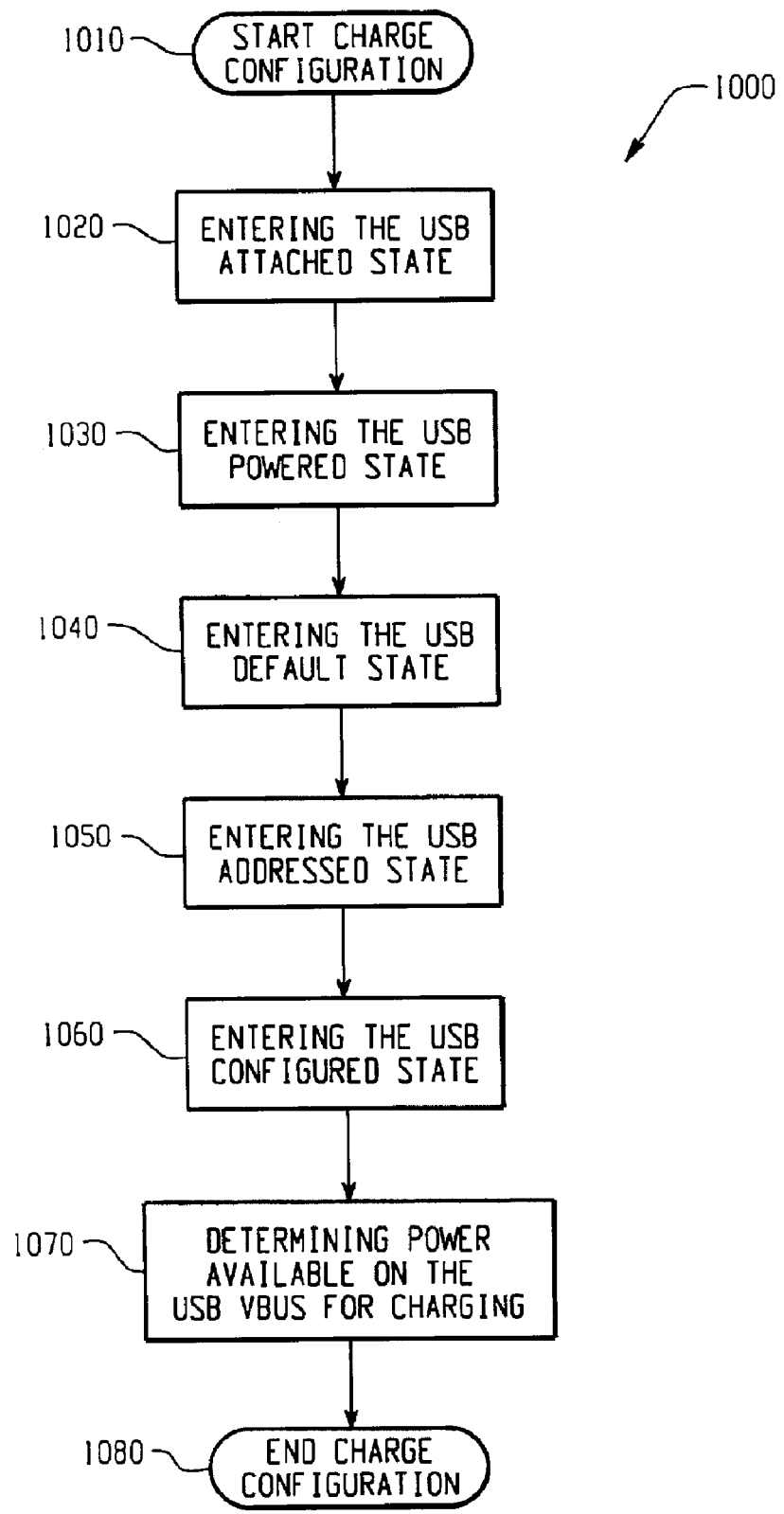
FIG. 11 is a flow diagram illustrating an exemplary method of establishing the charge configuration for the charging subsystem shown in FIG. 5.

FIG. 11 is a flow diagram 1000 illustrating an exemplary method of establishing the charge configuration 214 for the charging subsystem 16 shown in FIG. 5. The method begins at step 1010. In steps 1020–1060, a USB enumeration procedure is performed, and in step 1070 the power available on the USB Vbus power line 24 for charging is determined. The USB enumeration procedure is further described in the USB Specification, which has been incorporated herein by reference.

At step 1020, the mobile device 10 enters a USB attached state. This step 1020 may occur, for example, by connecting the device 10 to a USB port of the USB host or hub 22. At step 1030, the device 10 enters a USB powered state during which the USB host or hub 22 provides power to the device 10 via the Vbus power line 24.

At step 1040, the mobile device 10 enters a USB default state. During this step 1040, the USB host or hub 22 signals the mobile device 10 to reset via the USB interface 12. At this point, the mobile device 10 is addressable at a default address by the USB host or hub 22, and a default configuration is used by the charging subsystem 16 to determine the available power on the USB Vbus power line 24. For instance, in accordance with the USB specification, the charging subsystem 16 is restricted by the default configuration to a maximum 1 unit load (100 mA) drawn from the Vbus power line 24.

At step 1050, the mobile device 10 enters a USB addressed state during which the USB host or hub 22 assigns a new address to the device 10. At this point, the mobile device 10 is addressable at the assigned address by the USB host or hub 22.

At step 1060, the mobile device 10 enters a USB configured state during which the USB host or hub 22 assigns a configuration value to the device 10. The configuration value specifies the power allotted to the mobile device 10 from the USB Vbus power line 24. Then at step 1070, the charging subsystem 16 determines the amount of power from the USB interface 12 that can be utilized for charging the battery 18. If the allotted power is insufficient, then the mobile device 10 may perform a soft-disconnect operation to repeat the enumeration process, as described above with reference to FIG. 4.

Figure 12B:
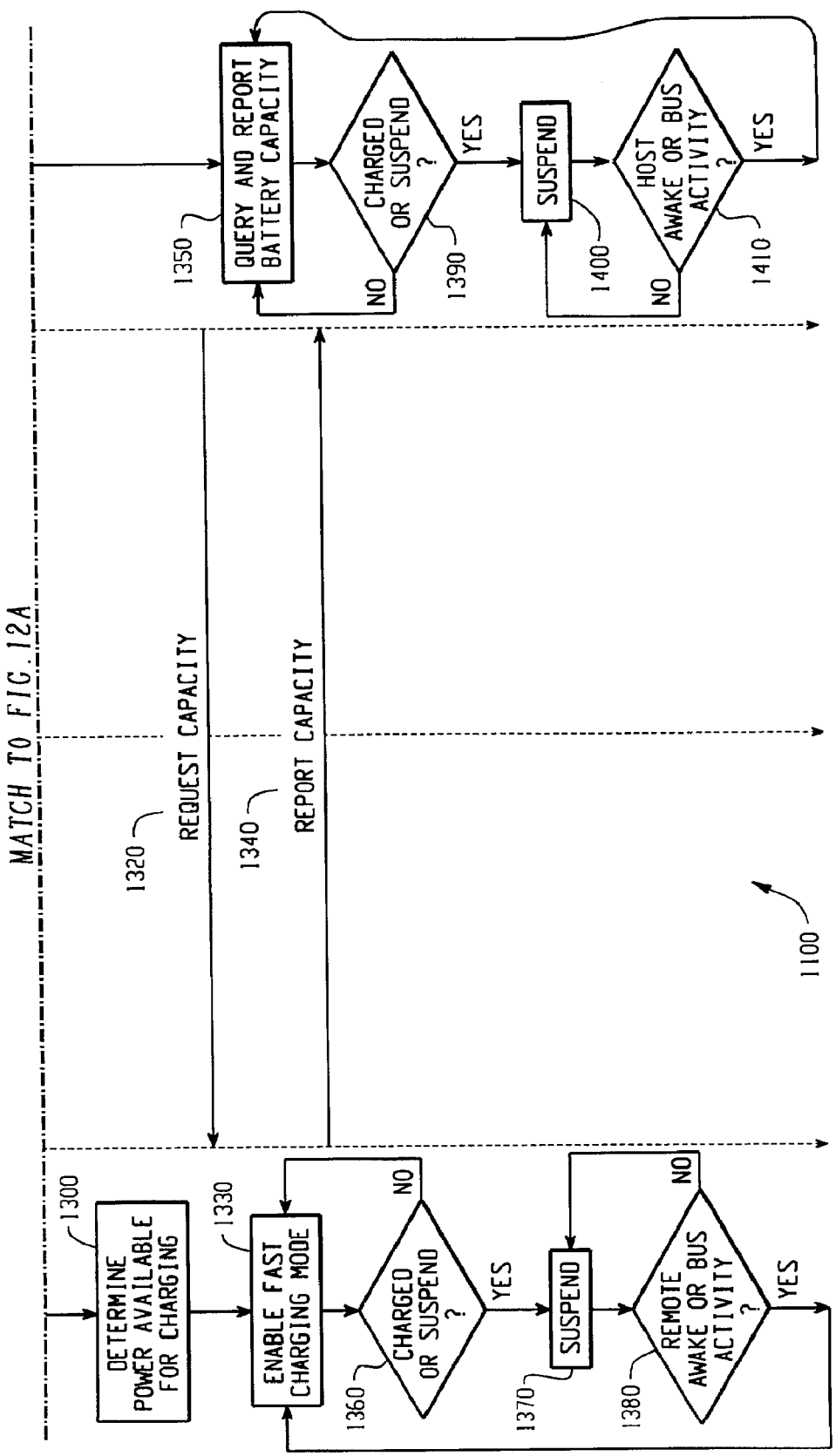
FIG. 12 is a diagram illustrating information flow between the mobile device, a USB hub, and a USB host while the mobile device is in charging mode.

FIG. 12 is a diagram 1100 illustrating information flow between the mobile device 10, a USB hub 1110, and a USB host 1120 while the mobile device 10 is in charging mode. The mobile device 10, USB hub 1110 and USB host 1120 are each illustrated as blocks with a directional, dotted line extending vertically downward to represent the flow of time. The information flow between each device 10, 1110, 1120 is illustrated by horizontal directional lines. Also included are two flow diagrams 1130, 1140 that illustrate the charging operation at the mobile device 10 and the USB host 1120, respectively. It should be understood, however, that although this diagram 1100 shows the USB hub 1120 coupled between the mobile device 10 and the USB host 1130, the illustrated charging operations 1130, 1140 could occur with the mobile device 10 coupled directly to the USB host 1120 via a USB cable.

When the mobile device 10 is attached to a USB port of the USB hub 1110, the USB controller 14 transmits a signal 1150, opening communication with the USB hub 1110. At this point, the charging subsystem 16 detects the presence of power on the Vbus power line 24, and enters the USB powered state 1160, as described above. Meanwhile, the USB hub 1110 informs the USB host 1120 that a status change has occurred via a status change pipe (step 1170). In response, the host 1120 queries the hub 1110 for the precise nature of the status change (step 1180), after which the hub 1110 replies to inform the host 1120 of the port to which the mobile device 10 is attached (step 1190).

After receiving a signal indicating that the mobile device 10 has been connected to a specified port on the USB hub 1110, the USB host 1120 waits for a predefined time period at step 1200, such as 100 ms, to ensure that the insertion process has completed at the USB port of the hub 1110, and to ensure that power has stabilized at the mobile device 10. The host 1120 then transmits a port enable and reset command 1210 to the USB hub 1110. In response, the hub 1110 relays the reset command to the mobile device by issuing a reset signal 1220 to the device 10.

After the reset signal 1220 is received, the mobile device 10 enters the USB default state 1230, as described above, during which the mobile device 10 is addressable at the default address, and the charging subsystem 16 may charge the battery 18 using up to the maximum power allotted by the default configuration (typically 100 mA). The mobile device 10 remains in the USB default state 1230 until a signal is received from the USB host 1120 in step 1240, assigning a unique address to the device 10. Once the unique address has been assigned, the mobile device 10 monitors the USB data lines 26 on the assigned address for configuration information from the host 1120 (step 1250).

The configuration information is transmitted from the host 1120 to the mobile device 10 using a three-pass handshake, illustrated by steps 1260, 1270 and 1280. In the first pass 1260, the USB host 1120 sends a signal to the assigned address of the mobile device 10 requesting the desired configuration. Then, in step 1270, the mobile device 10 transmits its requested configuration, including the desired Vbus power allotment, to the USB host 1120. In response, the configuration value is assigned by the host 1120 in step 1280, allotting the total power available to the mobile device 10 on the Vbus power line 24 from the USB hub 1110. Based on the assigned configuration value 1280, the mobile device 10 generates the charge configuration 214 to regulate the power drawn from the Vbus terminal 24 (step 1290), and determines the power available for fast (high-power) charging (step 1300).

Meanwhile, after the configuration value 1280 has been assigned, the USB host 1120 executes a device driver (step 1310) that is configured to request and receive reports from the mobile device 10 regarding the battery charging operation. The USB specification requires that the mobile device 10 be capable of detecting the lack of activity on the USB data lines 26, and reduce power consumption to the default power allotment of one unit (100 mA) during periods of inactivity. Therefore, the transmission of request and report data between the mobile device 10 and the USB host 1120 ensures that the USB data lines 26 remain active, enabling the mobile device 10 to continue drawing power at the higher rate (up to 500 mA) allotted by the assigned configuration value 1280.

In step 1320, the device driver on the USB host 1120 queries the battery capacity from the mobile device 10. Upon receiving the capacity request from the host 1120, the mobile device enters the fast (high-power) charging mode in step 1330, and transmits a report to the USB host 1120 indicating the battery capacity in step 1340. While the mobile device 10 remains in the fast (high-power) charging mode (step 1330), the USB host 1120 continues querying battery capacity from the mobile device and reporting the battery capacity to a user of the USB host (step 1350). In this manner, the bus remains active during the fast (high-power) charging operation, in accordance with the USB specification.

At step 1360, the mobile device 10 determines whether the battery 18 is fully charged and whether the USB data lines 26 remain active. As long as the battery 18 is depleted and the bus remains active, the mobile device 10 continues to charge the battery 18 in step 1330. If the battery becomes fully charged, or the USB data lines 26 become inactive, however, then the mobile device 10 enters a suspended state at step 1370 during which the maximum power drawn from the Vbus terminal 24 is reduced to the default value (100 mA). From the suspended state, the mobile device 10 monitors the bus for renewed activity (step 1380), and if activity is received the device 10 may return to the fast (high-power) charging mode in step 1330.

Similarly, the USB host 1120 may determine that the battery is charged, or host 1120 itself may become suspended (step 1390). In such a case, the USB host 1120 suspends the device driver in step 1400. Then, at step 2740, if the host 1120 is awakened or if there is renewed bus activity, the device driver is re-enabled, and querying and reporting resumes at step 1350.

Figure 13:
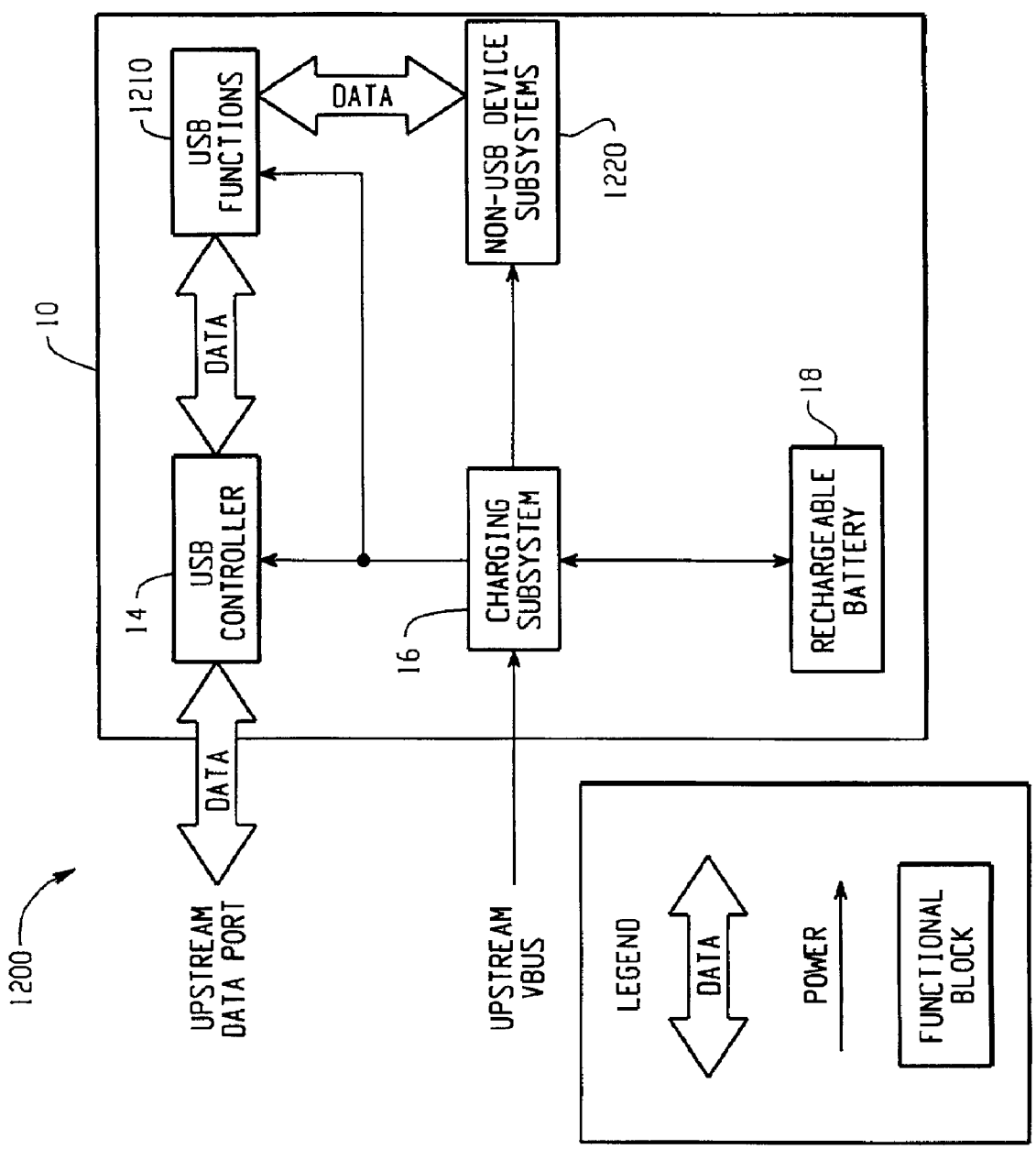
FIG. 13 is a block diagram illustrating power sourcing and sinking, and data communication within the mobile device.

FIG. 13 is a block diagram 1200 illustrating power sourcing and sinking, and data communication within the mobile device 10. For the purposes of this illustration 1200, the mobile device 10 has been divided into functional blocks, including the charging subsystem 16, the rechargeable battery 18, and the USB controller 14. In addition, a USB functions block 1210 includes any elements and/or subsystems in the mobile device 10 that operate only when the device 10 has established a data link with the USB host or hub 22, and a non-USB device subsystems block 1220 includes all other device elements and/or subsystems.

When the mobile device 10 is not attached to a USB host or hub 22 via the USB interface 12 (not shown), the USB controller 14 and USB functions blocks 14, 1210 are disabled, and thus receive no power or data communication from the rest of the mobile device 10. In this mode of operation, the charging subsystem 16 sinks power from the rechargeable battery 18, and contemporaneously sources power to the non-USB device subsystems 1220.

Once the mobile device 10 is attached to a USB host or hub 22 and enters the USB attached state (see FIG. 11), then all of the functional blocks other than the charging subsystem 16 are temporarily disabled. During this USB attached state, only the charging subsystem 16 sinks power from the Vbus power line 24.

When the mobile device 10 enters the USB powered state (see FIG. 11), the charging subsystem 16 supplies power to the USB controller 14 to establish data communication with the USB host or hub 22. All other functional blocks 1210, 1220 remain disabled until the device enters the USB default state (see FIG. 11).

In the USB default state, a single unit of bus power (100 mA) is allotted by the USB host or hub 22, and the charging subsystem 16 supplies power from the Vbus power line 24 to the USB controller 14 and the USB functions 1210. Similarly, when the device 10 enters the USB addressed state (see FIG. 11), the charging subsystem 16 sinks power from the Vbus power line 24, and sources power to the USB controller 14 and the USB functions 1210.

When the mobile device 10 enters the USB configured state (see FIG. 11), additional Vbus power is allotted by the USB host or hub 22 (currently up to 500 mA), and the charging subsystem 16 may provide power to charge the rechargeable battery 18. While the battery voltage remains discharged below a threshold level, the charging subsystem 16 sinks power from the Vbus power line 24, and sources power to the USB controller 14, the USB functions 1210, and the rechargeable battery 18. Then, when the battery voltage rises above the threshold, power from the battery 18 may be provided via the charging subsystem 16 to power the non-USB device subsystems 1220. In addition, the charging subsystem 16 may continue to sink power from the Vbus power line 24 during this mode of operation in order to maintain a full or substantially full charge on the rechargeable battery 18.

This written description uses examples to disclose the invention, including the best mode, and also to enable any person skilled in the art to make and use the invention. The patentable scope of the invention is defined by the claims, and may include other examples that occur to those skilled in the art. The present invention may provide utility to other applications, for example, for charging and powering a mobile communication device through alternative types of serial busses, such as a serial bus in accordance with the IEEE-1394 standard.

We claim:

1. A mobile communication device, comprising:
   a rechargeable battery for powering the mobile communication device;
   a Universal Serial Bus (USB) interface for connecting the mobile communication device to a USB host device;
   a charging subsystem coupled to the rechargeable battery and the USB interface, the charging subsystem being operable to charge the rechargeable battery with power received by the USB interface from the USB host device;
   means for requesting a power allotment from the USB host device, the power allotment controlling a maximum amount of power that the charging subsystem can draw from the USB host device; and
   means for determining if the power allotment received from the USB host device is less than a requested value, and if the power allotment is less than the requested value then resetting a USB connection between the mobile communication device and the USB host device in order to receive a new power allotment from the USB host device.

2. The mobile communication device of claim 1, wherein the USB interface includes USB data lines and USB power lines, and wherein the rechargeable battery is charged with power received from the USB host device via the USB power lines.

3. The mobile communication device of claim 2, wherein a connection between the USB host device and the mobile communication device via the USB data lines is interrupted in order to reset the USB connection between the mobile communication device and the USB host device.

4. The mobile communication device of claim 1, wherein the mobile communication device operable to request a lesser power allotment from the USB host device if the received power allotment is less than the requested value.

5. The mobile communication device of claim 1 further comprising:
   a soft-disconnect switch coupled between the USB interface and a processing device, wherein the soft-disconnect switch is opened and closed by the processing device in order to establish a USB charge configuration for the charging subsystem.

6. The mobile communication device of claim 5 further comprising:
   a communication subsystem coupled to the processing device and configured to communicate with a wireless communication system, wherein the rechargeable battery also supplies power to the communication subsystem.

7. The mobile communication device of claim 6, wherein the USB interface comprises a data line and a power line, wherein the power line is coupled to the charging subsystem and the soft-disconnect switch couples the data line to the processing device.

8. The mobile communication device of claim 7, further comprising:
   a USB controller coupled between the soft-disconnect switch and the processing device that monitors the data line and controls data communications over the data line between the processing device and a USB host or hub.

9. The mobile communication device of claim 6, wherein power to the mobile communication device is supplied through a power terminal, and wherein the charging subsystem comprises:

a power supplies switch having input terminals coupled to a power line on the USB interface and to the rechargeable battery and having an output terminal coupled to the power terminal, wherein the power supplies switch couples the power terminal to the rechargeable battery when the voltage level of the rechargeable battery is at or above a minimum threshold voltage and couples the power terminal to the power line when the rechargeable battery is below the minimum threshold voltage.

10. The mobile communication device of claim 9, wherein the charging subsystem further comprises:

a voltage regulator coupled between the power line and the power supplies switch, the voltage regulator configured to regulate the voltage on the power line and supply a substantially constant voltage to one of the input terminals of the power supplies switch.

11. The mobile communication device of claim 9, wherein the charging subsystem further comprises:

a charge controller coupled to the power line and the rechargeable battery, the charge controller configured to supply power to the rechargeable battery from the power line when the voltage level of the rechargeable battery is at a charging voltage value.

12. The mobile communication device of claim 11, wherein the charging subsystem further comprises:

a transistor having a first current-carrying terminal coupled to the power line, a second current-carrying terminal coupled to the rechargeable battery, and a control terminal coupled to the charge controller, wherein the charge controller controls the current flow through the current-carrying terminals of the transistor in order to control the amount of current supplied to the rechargeable battery from the power line.

13. The mobile communication device of claim 12, wherein the first current-carrying terminal is coupled to the power line through a series resistor.

14. The mobile communication device of claim 12, wherein the processing device is coupled to the charge controller to provide a charge configuration.

15. The mobile communication device of claim 12, wherein the charging subsystem further comprises:

a charge current monitor coupled between the second current-carrying terminal of the transistor and the rechargeable battery, the charge current monitor configured to monitor the current supplied to the rechargeable battery from the power line and generate a charge current signal.

16. The mobile communication device of claim 15, wherein the charging subsystem further comprises:

a charge current controller coupled to the charge current monitor that generates a control signal as a function of the charge current signal, wherein the control signal is coupled to the charge controller and is used by the charge controller to control the amount of current flow through the current-carrying terminals of the transistor.

17. The mobile communication device of claim 11, wherein the charge controller supplies power to the rechargeable battery in a multiple mode charging operation, the multiple mode charging operation including at least one operation selected from the group consisting of: constant current, constant voltage, constant power, programmable constant current, and pulse current.

18. A method of charging a rechargeable battery in a device having a charging subsystem, a USB interface and a processing device, the USB interface having Vbus and GND lines connected to the charging subsystem and D+ and D− lines electrically connected to the processing device, the charging subsystem connected to the rechargeable battery, the method comprising the steps of:

receiving a charge configuration from the USB interface;

signaling the charge configuration to the charging subsystem;

requesting a power allotment from the USB host device, the power allotment controlling a maximum amount of power that the charging subsystem can draw from the USB host device;

determining if the power allotment received from the USB host device is less than a requested value, and if the power allotment is less than the requested value then resetting a USB connection between the mobile communication device and the USB host device in order to receive a new power allotment from the USB host device;

deriving power from the Vbus and GND lines at the charging subsystem; and charging the rechargeable battery using the derived power using the charging subsystem.

19. The method of claim 18 wherein the device further comprises a soft-disconnect switch coupling the D+ and D− lines to the processing device, the method further comprising the steps of:

soft-disconnecting from the USB interface; and soft-connecting to the USB interface.

20. The method of claim 19 further comprising the steps of:

computing a maximum value for a power allotment request for the purpose of charging;

soft-connecting to send the power allotment request via the USB interface; and if the power allotment request is not granted, soft-disconnecting, decreasing the power allotment request and repeating the previous step until the request is granted.

21. The method of claim 18 further comprising the steps of:

detecting the presence of a host or hub via the USB interface;

receiving a charge configuration from the host or hub; and signaling the charge configuration to the charging subsystem.

22. The method of claim 21 further comprising the step of signaling a charge status to the host or hub via the USB interface.

23. A method of charging a mobile communication device having a rechargeable battery and a charging subsystem, the mobile communication device connected via a unified data and power bus to a host system, the method comprising the steps of:

obtaining a charge configuration from the unified bus;

applying the charge configuration to the charging subsystem;

requesting a power allotment from the USB host device, the power allotment controlling a maximum amount of power that the charging subsystem can draw from the USB host device;

determining if the power allotment received from the USB host device is less than a requested value, and if the power allotment is less than the requested value then resetting a USB connection between the mobile communication device and the USB host device in order to receive a new power allotment from the USB host device;

and charging the rechargeable battery using power derived from the unified bus.

24. The method of claim 23, wherein the unified bus is a Universal Serial Bus (USB), the method further comprising before obtaining a charge configuration, the steps of:

entering the USB attached state;

entering the USB powered state;

entering the USB default state;

entering the USB addressed state; and entering the USB configured state.

25. The method of claim 24 further comprising the step of providing a USB charging function at the host which operates over the USB.

26. The method of claim 25 further comprising the step of providing a USB Personal Information Management (PIM) synchronization function at the host which operates over the USB.

27. The method of claim 23 further comprising the steps of:

receiving a battery capacity request from the host via the unified bus; and reporting the capacity to the host via the unified bus.

28. A mobile communication device, comprising:

a rechargeable battery for powering the mobile communication device;

a Universal Serial Bus (USB) interface for connecting the mobile communication device to a USB host device;

a charging subsystem coupled to the rechargeable battery and the USB interface, the charging subsystem being operable to charge the rechargeable battery with power received by the USB interface from the USB host device;

a processing device for requesting a power allotment from the USB host device, the power allotment controlling a maximum amount of power that the charging subsystem can draw from the USB host device;

the processing device being operable to determine if the power allotment received from the USB host device is less than a requested value, and if the power allotment is less than the requested value then the processing device resets a USB connection between the mobile communication device and the USB host device in order to receive a new power allotment from the USB host device.

29. The mobile communication device of claim 28, wherein the USB interface includes USB data lines and USB power lines, and wherein the rechargeable battery is charged with power received from the USB host device via the USB power lines.

30. The mobile communication device of claim 29, wherein a connection between the USB host device and the mobile communication device via the USB data lines is interrupted in order to reset the USB connection between the mobile communication device and the USB host device.

31. The mobile communication device of claim 28, wherein the mobile communication device is operable to request a lesser power allotment from the USB host device if the received power allotment is less than the requested value.

32. The mobile communication device of claim 28 further comprising:

a soft-disconnect switch coupled between the USB interface and a processing device, wherein the soft-disconnect switch is opened and closed by the processing device in order to establish a USB charge configuration for the charging subsystem.

33. The mobile communication device of claim 32 further comprising:

a communication subsystem coupled to the processing device and configured to communicate with a wireless communication system, wherein the rechargeable battery also supplies power to the communication subsystem.

34. The mobile communication device of claim 33, wherein the USB interface comprises a data line and a power line, wherein the power line is coupled to the charging subsystem and the soft-disconnect switch couples the data line to the processing device.

35. The mobile communication device of claim 34, further comprising:

a USB controller coupled between the soft-disconnect switch and the processing device that monitors the data line and controls data communications over the data line between the processing device and a USB host or hub.

36. The mobile communication device of claim 33, wherein power to the mobile communication device is supplied through a power terminal, and wherein the charging subsystem comprises:

a power supplies switch having input terminals coupled to a power line on the USB interface and to the rechargeable battery and having an output terminal coupled to the power terminal, wherein the power supplies switch couples the power terminal to the rechargeable battery when the voltage level of the rechargeable battery is at or above a minimum threshold voltage and couples the power terminal to the power line when the rechargeable battery is below the minimum threshold voltage.

37. The mobile communication device of claim 36, wherein the charging subsystem further comprises:

a voltage regulator coupled between the power line and the power supplies switch, the voltage regulator configured to regulate the voltage on the power line and supply a substantially constant voltage to one of the input terminals of the power supplies switch.

38. The mobile communication device of claim 36, wherein the charging subsystem further comprises:

a charge controller coupled to the power line and the rechargeable battery, the charge controller configured to supply power to the rechargeable battery from the power line when the voltage level of the rechargeable battery is at a charging voltage value.

39. The mobile communication device of claim 38, wherein the charging subsystem further comprises:

a transistor having a first current-carrying terminal coupled to the power line, a second current-carrying terminal coupled to the rechargeable battery, and a control terminal coupled to the charge controller, wherein the charge controller controls the current flow through the current-carrying terminals of the transistor in order to control the amount of current supplied to the rechargeable battery from the power line.

40. The mobile communication device of claim 39, wherein the first current-carrying terminal is coupled to the power line through a series resistor.

41. The mobile communication device of claim 39, wherein the processing device is coupled to the charge controller to provide a charge configuration.

42. The mobile communication device of claim 39, wherein the charging subsystem further comprises:

a charge current monitor coupled between the second current-carrying terminal of the transistor and the rechargeable battery, the charge current monitor configured to monitor the current supplied to the rechargeable battery from the power line and generate a charge current signal.

43. The mobile communication device of claim 42, wherein the charging subsystem further comprises:

a charge current controller coupled to the charge current monitor that generates a control signal as a function of the charge current signal, wherein the control signal is coupled to the charge controller and is used by the charge controller to control the amount of current flow through the current-carrying terminals of the transistor.

44. The mobile communication device of claim 38, wherein the charge controller supplies power to the rechargeable battery in a multiple mode charging operation, the multiple mode charging operation including at least one operation selected from the group consisting of: constant current, constant voltage, constant power, programmable constant current, and pulse current.

\* \* \* \* \*